(12) United States Patent
Kwon et al.

(10) Patent No.: US 12,279,131 B2
(45) Date of Patent: Apr. 15, 2025

(54) METHODS AND APPARATUS FOR TRANSMITTING SYNCHRONIZATION SIGNALS

(71) Applicant: Huawei Technologies Co., Ltd., Shenzhen (CN)

(72) Inventors: Young Hoon Kwon, Laguna Niguel, CA (US); Pengfei Xia, San Diego, CA (US); Bin Liu, San Diego, CA (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 519 days.

(21) Appl. No.: 17/627,536

(22) PCT Filed: Jul. 19, 2019

(86) PCT No.: PCT/US2019/042596
§ 371 (c)(1),
(2) Date: Jan. 14, 2022

(87) PCT Pub. No.: WO2020/096661
PCT Pub. Date: May 14, 2020

(65) Prior Publication Data
US 2022/0361004 A1 Nov. 10, 2022

(51) Int. Cl.
| H04W 16/28 | (2009.01) |
| H04B 7/0426 | (2017.01) |
| H04W 52/24 | (2009.01) |
| H04W 56/00 | (2009.01) |
| H04B 7/06 | (2006.01) |
| H04B 7/155 | (2006.01) |

(52) U.S. Cl.
CPC ............ *H04W 16/28* (2013.01); *H04B 7/043* (2013.01); *H04W 52/242* (2013.01); *H04W 56/001* (2013.01); *H04B 7/0617* (2013.01); *H04B 7/0695* (2013.01); *H04B 7/1555* (2013.01)

(58) Field of Classification Search
None
See application file for complete search history.

(56) References Cited

U.S. PATENT DOCUMENTS

| 2003/0017853 | A1 | 1/2003 | Kanamaluru et al. |
| 2003/0072306 | A1* | 4/2003 | Hunzinger ............ G01S 5/0289 370/252 |
| 2011/0206155 | A1 | 8/2011 | Fujimura et al. |
| 2016/0270087 | A1 | 9/2016 | Soriaga et al. |
| 2016/0356876 | A1* | 12/2016 | Lazik ........................ G01S 5/18 |
| 2016/0380684 | A1* | 12/2016 | Werner ................ H04B 7/0465 375/267 |
| 2019/0319756 | A1* | 10/2019 | Moshfeghi ........... H04B 7/0408 |
| 2020/0028262 | A1* | 1/2020 | Fang ........................ H01Q 3/46 |

(Continued)

*Primary Examiner* — Jutai Kao
(74) *Attorney, Agent, or Firm* — Slater Matsil, LLP

(57) ABSTRACT

A method implemented by a device includes determining a direction of a first signal received from a signal source, beamforming a second signal in accordance with a first beamforming gain of a transmission of the second signal oriented in accordance with the direction of the first signal source, and a second beamforming gain of the transmission of the second signal oriented in accordance with an intended direction of the second signal, the first beamforming gain being smaller than the second beamforming gain, and transmitting, by the device, the beamformed second signal.

25 Claims, 10 Drawing Sheets

(56) References Cited

U.S. PATENT DOCUMENTS

2020/0059965 A1* 2/2020 Mangalvedhe ....... H04L 5/0048
2020/0106582 A1* 4/2020 Jalali ................... H04B 17/318
2020/0322812 A1* 10/2020 Shi ....................... H04W 16/28
2021/0143959 A1* 5/2021 Xu ....................... H04W 56/001
2022/0264321 A1* 8/2022 Huang ................. H04B 7/0695

* cited by examiner

Fig. 8A   [UE CLOSE TO SYNC SOURCE]

[UE FAR FROM SYNC SOURCE]

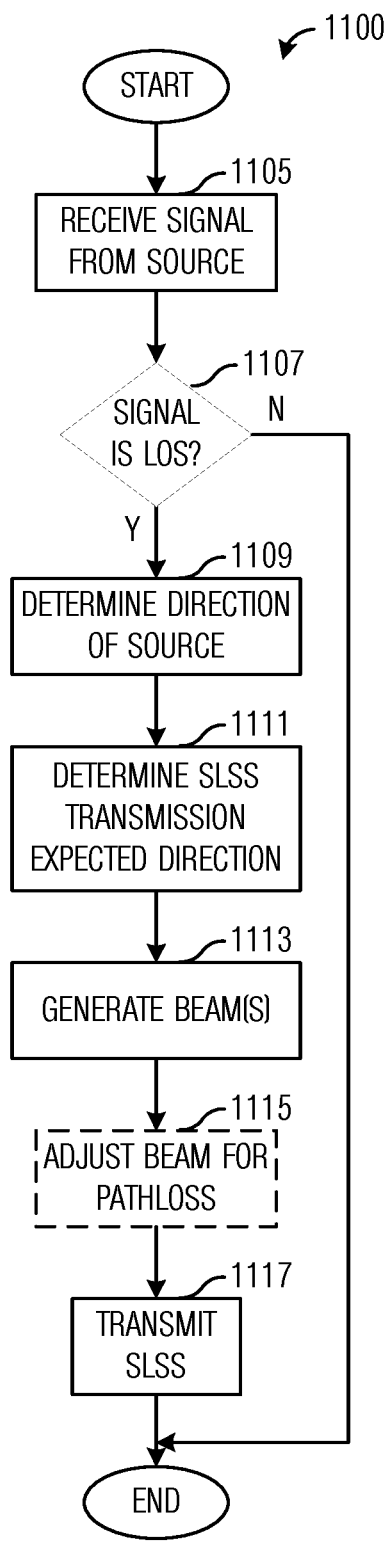
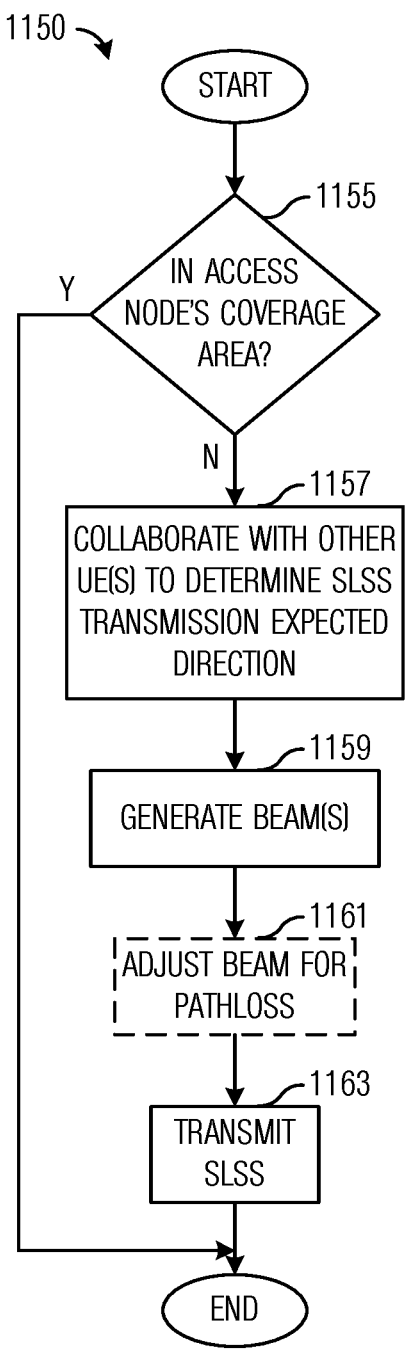
Fig. 11A
Fig. 11B

METHODS AND APPARATUS FOR TRANSMITTING SYNCHRONIZATION SIGNALS

CROSS-REFERENCE TO RELATED APPLICATIONS

This application is a national phase filing under section 371 of PCT Application No. PCT/US19/42596, filed on Jul. 19, 2019 and entitled "Methods and Apparatus for Transmitting Synchronization Signals," which is hereby incorporated by reference herein as if reproduced in its entirety.

TECHNICAL FIELD

The present disclosure relates generally to methods and apparatus for digital communications and, in particular embodiments, to methods and apparatus for transmitting synchronization signals.

BACKGROUND

One possible deployment scenario for fifth generation (5G) New Radio (NR) system architecture uses high frequency (HF) (6 gigahertz (GHz) and above, such as millimeter wavelength (mmWave)) operating frequencies to exploit greater available bandwidth and less interference then what is available at the congested lower frequencies. However, pathloss is a significant issue. Beamforming may be used to overcome the high pathloss.

Beamformed beams are typically directional in nature. The directional nature of the beams may complicate communications. As an example, communicating devices with one or more misaligned beams can suffer from temporal link quality degradation. Therefore, there is a need for methods and apparatus capable of providing adaptive beam control particularly in time-sensitive communications as encountered in Device-to-Device (D2D) and Vehicle-to-Device (V2X) communications.

SUMMARY

According to a first aspect, a method implemented by a device is provided. The method includes determining, by the device, a direction of a first signal received from a first signal source, determining, by the device, an intended direction of a second signal in accordance with the direction of the first signal source, with a first beamforming gain of a transmission of the second signal oriented in accordance with the direction of the first signal source being smaller than a second beamforming gain of the transmission of the second signal oriented in accordance with at least a portion of the intended direction, beamforming, by the device, the second signal in accordance with the first and second beamforming gains, and transmitting, by the device, the beamformed second signal.

In a first implementation form of the method according to the first aspect as such, the intended direction comprising a direction that is opposite to the direction of the first signal source.

In a second implementation form of the method according to the first aspect as such or any preceding implementation form of the first aspect, the intended direction comprising multiple directions not including the direction of the first signal source.

In a third implementation form of the method according to the first aspect as such or any preceding implementation form of the first aspect, the intended direction comprising multiple directions including a direction that is opposite to the direction of the first signal source.

In a fourth implementation form of the method according to the first aspect as such or any preceding implementation form of the first aspect, the direction of the first signal source comprising an angle of arrival (AoA) of the first signal.

In a fifth implementation form of the method according to the first aspect as such or any preceding implementation form of the first aspect, the device comprising a user equipment (UE).

In a sixth implementation form of the method according to the first aspect as such or any preceding implementation form of the first aspect, the first signal comprising a first synchronization signal, and the second signal comprising a second synchronization signal.

In a seventh implementation form of the method according to the first aspect as such or any preceding implementation form of the first aspect, further comprising adjusting, by the device, at least the second beamforming gain in accordance with a pathloss between the device and the first signal source.

In an eighth implementation form of the method according to the first aspect as such or any preceding implementation form of the first aspect, further comprising receiving, by the device, a third signal from a second signal source, determining, by the device, an intended direction of a fourth signal in accordance with a direction of the second signal source and the direction of the first signal source, a third beamforming gain of a transmission of the fourth signal oriented in accordance with the direction of the second signal source being smaller than a fourth beamforming gain of the transmission of the fourth signal oriented in accordance with at least a portion of the intended direction of the fourth signal, and a fifth beamforming gain of the transmission of the fourth signal oriented in accordance with the direction of the first signal source being smaller than the fourth beamforming gain, beamforming, by the device, the fourth signal in accordance with at least the third and fourth beamforming gains, and transmitting, by the device, the beamformed fourth signal.

In a ninth implementation form of the method according to the first aspect as such or any preceding implementation form of the first aspect, the first signal having lower priority than a third signal, the method further comprising receiving, by the device, the third signal from a second signal source, determining, by the device, an intended direction of a fourth signal in accordance with a direction of the second signal source, a third beamforming gain of a transmission of the fourth signal oriented in accordance with the direction of the second signal source being smaller than a fourth beamforming gain of the transmission of the fourth signal oriented in accordance with at least a portion of the intended direction of the fourth signal, beamforming, by the device, the fourth signal in accordance with at least the third and fourth beamforming gains, and transmitting, by the device, the beamformed fourth signal.

In a tenth implementation form of the method according to the first aspect as such or any preceding implementation form of the first aspect, further comprising determining, by the device, that the first signal source is a line of sight (LOS) signal source prior to determining the intended direction for the second signal, beamforming the second signal, and transmitting the second signal.

In an eleventh implementation form of the method according to the first aspect as such or any preceding implementation form of the first aspect, at least a first beam with the first beamforming gain and a second beam with the second beamforming gain being used to beamform the second signal.

In a twelfth implementation form of the method according to the first aspect as such or any preceding implementation form of the first aspect, a first beamwidth of the first beam oriented in accordance with the direction of the first signal source being greater than a second beamwidth of the second beam oriented in accordance with the at least a portion of the intended direction.

In a thirteenth implementation form of the method according to the first aspect as such or any preceding implementation form of the first aspect, further comprising adjusting, by the device, a beamforming gain of at least the second beam in accordance with a pathloss between the device and the first signal source.

According to a second aspect, a method implemented by a first device is provided. The method includes determining, by the first device, a direction of a second device, determining, by the first device, an intended direction of a signal in accordance with the direction of the second device, a first beamforming gain of a transmission of the signal oriented in accordance with the direction of the second device being smaller than a second beamforming gain of the transmission of the signal oriented in accordance with at least a portion of the intended direction, beamforming, by the first device, the signal in accordance with the first and second beamforming gains, and transmitting, by the first device, the beamformed signal.

In a first implementation form of the method according to the second aspect as such, further comprising transmitting, by the first device, directional information of the first device.

In a second implementation form of the method according to the second aspect as such or any preceding implementation form of the second aspect, the directional information comprising an absolute position of the first device, or a position of the first device relative to a first reference point.

In a third implementation form of the method according to the second aspect as such or any preceding implementation form of the second aspect, the intended direction comprising a direction that is opposite to the direction of the second device.

In a fourth implementation form of the method according to the second aspect as such or any preceding implementation form of the second aspect, the intended direction comprising multiple directions not including the direction of the second device.

In a fifth implementation form of the method according to the second aspect as such or any preceding implementation form of the second aspect, the intended direction comprising multiple directions including a direction that is opposite to the direction of the second device.

In a sixth implementation form of the method according to the second aspect as such or any preceding implementation form of the second aspect, further comprising adjusting, by the first device, at least the second beamforming gain in accordance with a pathloss between the first device and the second device.

In a seventh implementation form of the method according to the second aspect as such or any preceding implementation form of the second aspect, the direction of the second device being determined in accordance with directional information of the second device, the directional information of the second device comprising an absolute position of the second device or a position of the second device relative to a second reference point, and the method further comprising transmitting from the first device to the second device, directional information of the first device, the intended direction of the signal being determined in accordance with the directional information of the first device.

According to a third aspect, a device is provided. The device includes one or more processors, a transceiver operatively coupled to the one or more processors, the transceiver configured to send and receive signals, and a non-transitory memory storage comprising instructions that, when executed by the one or more processors, cause the device to determine a direction of a first signal received from a first signal source, determine an intended direction of a second signal in accordance with the direction of the first signal source, with a first beamforming gain of a transmission of the second signal oriented in accordance with the direction of the first signal source being smaller than a second beamforming gain of the transmission of the second signal oriented in accordance with at least a portion of the intended direction, beamform the second signal in accordance with the first and second beamforming gains, and transmit the beamformed second signal.

In a first implementation form of the device according to the third aspect as such, the intended direction comprising a direction that is opposite to the direction of the first signal source.

In a second implementation form of the device according to the third aspect as such or any preceding implementation form of the third aspect, the intended direction comprising multiple directions not including the direction of the first signal source.

In a third implementation form of the device according to the third aspect as such or any preceding implementation form of the third aspect, the intended direction comprising multiple directions including a direction that is opposite to the direction of the first signal source.

In a fourth implementation form of the device according to the third aspect as such or any preceding implementation form of the third aspect, the direction of the first signal source comprising an AoA of the first signal.

In a fifth implementation form of the device according to the third aspect as such or any preceding implementation form of the third aspect, the one or more processors executing the instructions to cause the device to adjust at least the second beamforming gain in accordance with a pathloss between the device and the first signal source.

In a sixth implementation form of the device according to the third aspect as such or any preceding implementation form of the third aspect, the one or more processors executing the instructions to cause the device to receive a third signal from a second signal source, determine an intended direction of a fourth signal in accordance with a direction of the second signal source and the direction of the first signal source, with a third beamforming gain of a transmission of the fourth signal oriented in accordance with the direction of the second signal source being smaller than a fourth beamforming gain of the transmission of the fourth signal oriented in accordance with at least a portion of the intended direction of the fourth signal, and a fifth beamforming gain of the transmission of the fourth signal oriented in accordance with the direction of the first signal source being smaller than the fourth beamforming gain, beamform the fourth signal in accordance with at least the third and fourth beamforming gains, and transmit the beamformed fourth signal.

In a seventh implementation form of the device according to the third aspect as such or any preceding implementation form of the third aspect, the first signal having lower priority than a third signal, and the one or more processors executing the instructions to cause the device to receive a third signal from a second signal source, determine an intended direction of a fourth signal in accordance with a direction of the second signal source, with a third beamforming gain of a transmission of the fourth signal oriented in accordance with the direction of the second signal source being smaller than a fourth beamforming gain of the transmission of the fourth signal oriented in accordance with at least a portion of the intended direction of the fourth signal, beamform the fourth signal in accordance with at least the third and fourth beamforming gains, and transmit the beamformed fourth signal.

In an eighth implementation form of the device according to the third aspect as such or any preceding implementation form of the third aspect, the one or more processors executing the instructions to cause the device to determine that the first signal source is a LOS signal source prior to determining the intended direction for the second signal, beamforming the second signal, and transmitting the second signal.

In a ninth implementation form of the device according to the third aspect as such or any preceding implementation form of the third aspect, at least a first beam with the first beamforming gain and a second beam with the second beamforming gain being used to beamform the second signal.

According to a fourth aspect, a device is provided. The device includes one or more processors, and a non-transitory memory storage comprising instructions that, when executed by the one or more processors, cause the device to determine a direction of a second device, determine an intended direction of a signal in accordance with the direction of the second device, with a first beamforming gain of a transmission of the signal oriented in accordance with the direction of the second device being smaller than a second beamforming gain of the transmission of the signal oriented in accordance with at least a portion of the intended direction, beamform the signal in accordance with the first and second beamforming gains, and transmit the beamformed signal.

In a first implementation form of the device according to the fourth aspect as such, the one or more processors executing the instructions to cause the device to transmit, to the second device, directional information of the device.

In a second implementation form of the device according to the fourth aspect as such or any preceding implementation form of the fourth aspect, the direction of the second device being determined in accordance with directional information of the second device, the directional information of the second device comprising an absolute position of the second device or a position of the second device relative to a second reference point, and the one or more processors executing the instructions to cause the device to transmit, to the second device, directional information of the device, the intended direction of the signal being determined in accordance with the directional information of the device.

An advantage of a preferred embodiment is that the coverage of synchronization signals transmitted by a UE is maximized, for situations where the UE is operating within the coverage area of an access node or where the UE is operating outside of the coverage area of the access node. Additionally, the UE discovery range for device-to-device communications is extended.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 8A illustrates a communications system highlighting a first example use of pathloss in determining the coverage pattern of the SLSS transmission according to example embodiments presented herein;

FIG. 11A illustrates a flow diagram of operations occurring in a UE transmitting a SLSS when the UE is located within a coverage area of a serving access node according to example embodiments presented herein;

FIG. 11B illustrates a flow diagram of operations occurring in a UE transmitting a SLSS when the UE is one of multiple UEs transmitting SLSSs according to example embodiments presented herein;

DETAILED DESCRIPTION OF ILLUSTRATIVE EMBODIMENTS

The structure and use of disclosed embodiments are discussed in detail below. It should be appreciated, however, that the present disclosure provides many applicable concepts that can be embodied in a wide variety of specific contexts. The specific embodiments discussed are merely illustrative of specific structure and use of embodiments, and do not limit the scope of the disclosure.

Figure 1:
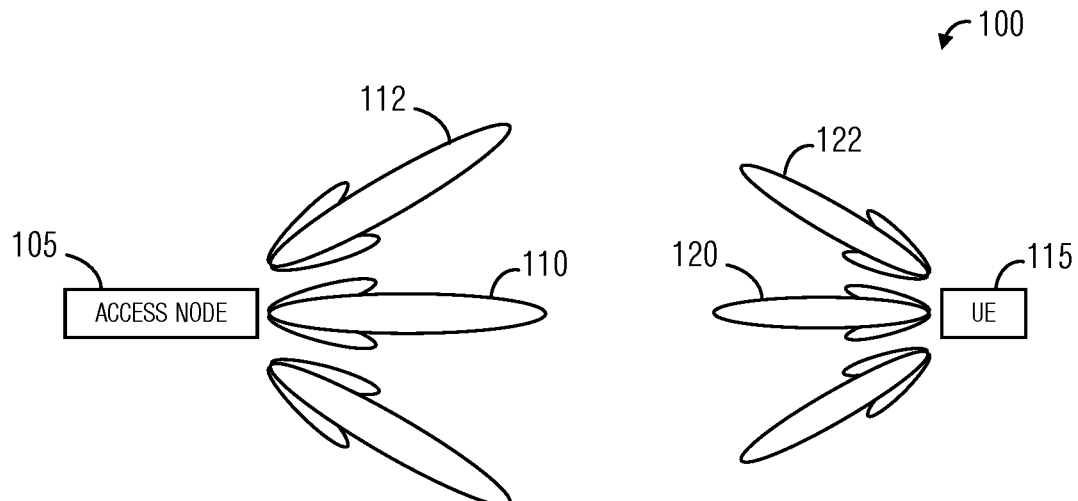
FIG. 1 illustrates an example communications system.

FIG. 1 illustrates an example communications system 100. Communications system 100 includes an access node 105 serving a user equipment (UE) 115. In a first operating mode, communications to and from UE 115 pass through access node 105. In a second operating mode, communications to and from UE 115 do not pass through access node 105, however, access node 105 typically allocates resources used by UE 115 to communicate when specific conditions have been met. Access nodes may also be commonly referred to as Node Bs, evolved Node Bs (eNBs), next generation (NG) Node Bs (gNBs), master eNBs (MeNBs), secondary eNBs (SeNBs), master gNBs (MgNBs), secondary gNBs (SgNBs), network controllers, control nodes, base stations, access points, transmission points (TPs), transmission-reception points (TRPs), cells, carriers, macro cells, femtocells, pico cells, and so on, while UEs may also be commonly referred to as mobile stations, mobiles, terminals, users, subscribers, stations, and the like. Access nodes may provide wireless access in accordance with one or more wireless communication protocols, e.g., the Third Generation Partnership Project (3GPP) long term evolution (LTE), LTE advanced (LTE-A), 5G, 5G LTE, NR, High Speed Packet Access (HSPA), the IEEE 802.11 family of standards, such as 802.11a/b/g/n/ac/ad/ax/ay/be, Wi-Fi, etc. While it is understood that communications systems may employ multiple access nodes capable of communicating with a number of UEs, only one access node and one UE are illustrated for simplicity.

As discussed previously, pathloss in communications systems operating at high frequency (HF) (6 gigahertz (GHz) and above, such as millimeter wavelength (mm-Wave)) operating frequencies, is high, and beamforming may be used to overcome the high pathloss. As shown in FIG. 1, both access node 105 and UE 115 communicate using beamformed transmissions and receptions. As an example, access node 105 communicates using a plurality of communications beams, including beams no and 112, while UE 115 communicates using a plurality of communications beams, including beams 120 and 122.

A beam may be pre-defined by a set of beamforming weights in the context of codebook-based precoding or a dynamically defined set of beamforming weights in the context of non-codebook based precoding (e.g., Eigen-based beamforming (EBB)). A beam may also be pre-defined coefficients for a set of phase shifted preprocessor-combining signals from the antenna array in the radio frequency (RF) domain. It should be appreciated that a UE may rely on codebook-based precoding to transmit uplink signals and receive downlink signals, while a TRP may rely on non-codebook based precoding to form certain radiation patterns to transmit downlink signals or receive uplink signals.

Figure 2:
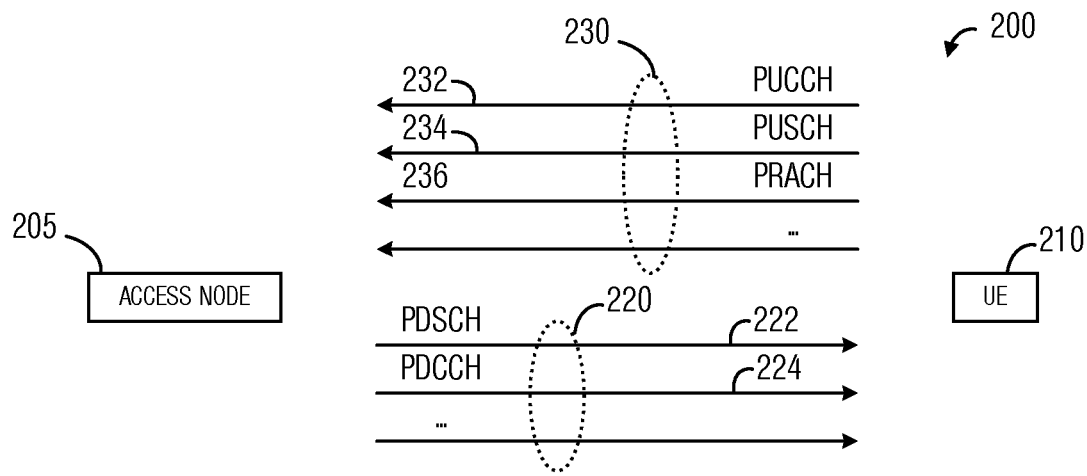
FIG. 2 illustrates a communications system highlighting an example channel structure between an access node and a UE.

FIG. 2 illustrates a communications system 200 highlighting an example channel structure between an access node 205 and a UE 210. In a bi-directional communications implementation, there is a downlink channel 220 and an uplink channel 230 between access node 205 and UE 210. Downlink channel 220 and uplink channel 230 may each include a plurality of unidirectional channels. As shown in FIG. 2, downlink channel 220 includes a physical downlink shared channel (PDSCH) 222 and a physical downlink control channel (PDCCH) 224 among others, while uplink channel 230 includes a physical uplink control channel (PUCCH) 232, a physical uplink shared channel (PUSCH) 234, and a physical random access channel (PRACH) 236, among others. Other channels may be present in downlink channel 220 or uplink channel 230 but are not shown in FIG. 2.

Figure 3:
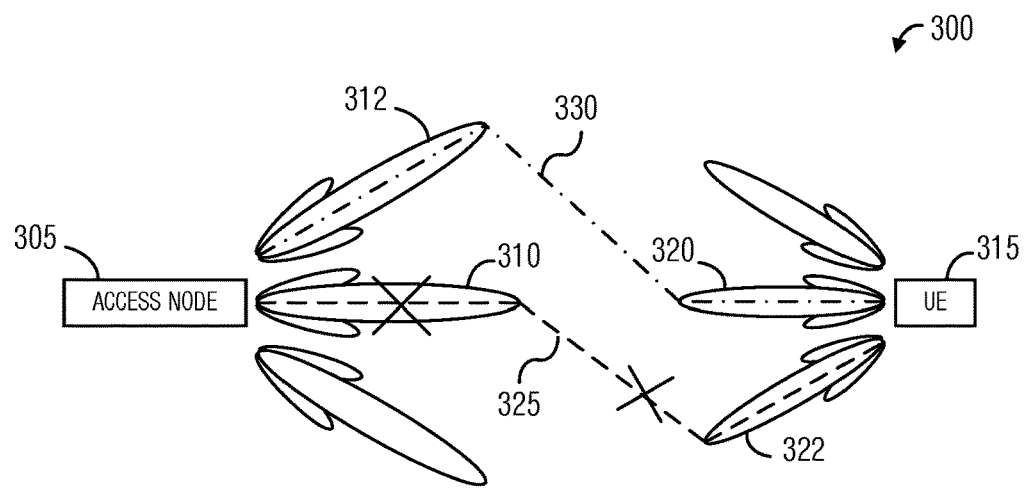
FIG. 3 illustrates a wireless communications system highlighting beam failure and beam failure recovery.

FIG. 3 illustrates a wireless communications system 300 highlighting beam failure and beam failure recovery. Communications system 300 includes an access node 305 serving a UE 315. As shown in FIG. 3, both access node 305 and UE 315 communicate using beamformed transmissions and receptions. As an example, access node 305 communicates using a plurality of communications beams, including beams 310 and 312, while UE 315 communicates using a plurality of communications beams, including beams 320 and 322.

Initially, access node 305 and UE 315 are communicating through beam pair link (BPL) 325, which comprises beams 310 and 322. However, for any of a number of reasons, such as a blockage or UE mobility, BPL 325 fails. UE 315 detects a candidate beam 312 from access node 305 to replace failed beam 310, for example. UE 315 initiates beam failure recovery by sending a beam failure recovery request (BFRQ) to access node 305. Upon completion of the beam failure recovery, BPL 330 is established (comprising beams 312 and 320).

When two or more reference signals, data signals, or resources are related in such a way that the two or more reference signals, data signals, or resources may be viewed as possessing similar characteristics, they are said to possess a quasi-collocated (QCL) relationship or that they are QCL'ed. QCL relationships may refer to time, frequency, code, or spatial relationships between two or more reference signals, data signals, or resources, while spatial QCL refers to only spatial relationships between two or more reference signals, data signals, or resources. The spatial QCL information may include associations between signals and resources, such as channel status information-reference signal (CSI-RS) resources and wideband reference signals (WBRS), or associations between individual WBRSs, or associations between CSI-RS resources and beamformed random access channels (BRACHs). As an example, in a one-to-one association, each CSI-RS signal is associated with one WBRS such that the transmit precoder for the CSI-RS signal is the same as a transmit precoder for the WBRS. As another example, each CSI-RS signal is associated with one WBRS such that the transmit precoder for the CSI-RS signal is the same as a transmit precoder for the WBRS. As another example, a first WBRS is associated with a second WBRS such that the transmit precoder for the second WBRS is the same as that for the first WBRS. It is possible that multiple CSI-RS signals are associated with a single WBRS, and vice versa. The spatial QCL information may be stored in tabular form or in a memory of a device. The spatial QCL information includes associations between CSI-RS and WBRSs. The spatial QCL information may be used by the UE to determine CSI-RS beam indices from WBRS beam indices, and vice versa, for example. As an example, in a one to one association, each CSI-RS signal is associated with one WBRS. It is possible that multiple CSI-RS signals are associated with a single WBRS, and vice versa.

As used in the discussion presented herein, the term QCL may generally refer to both QCL and spatial QCL. In circumstances where such usage would lead to confusion, spatial QCL will be used as needed.

Work is proceeding on the NR Release 16 (Rel-16) technical standards, including vehicle-to-anything (V2X) study item (SI) or work item (WI) that covers direct communications between UEs (including vehicles). V2X communications is similar to device-to-device (D2D) communications as specified in the D2D technical standards of 3GPP LTE D2D. The NR V2X technical standards is supposed to support communications in both low frequencies (Frequency Range 1 (FR1), less than 6 GHz) and high frequencies (Frequency Range 2 (FR2), millimeter wavelength (mmWave) and beyond). The NR V2X technical standards are intended to include many of the features of the 3GPP LTE D2D technical standards. However, because the carrier frequency of the 3GPP LTE D2D technical standards only covers FR1, FR2-specific features that need to be addressed in NR V2X are not present in the 3GPP LTE D2D technical standards.

In a 3GPP LTE D2D compliant communications system, some UEs may transmit sidelink synchronization signals (SLSS) to help other UEs obtain the timing of the SLSS-transmitting UEs. The SLSS may also be used to help other UEs identify the SLSS-transmitting UEs. The SLSS may be considered to be a forwarded version of a synchronization signal (SS) transmitted by an access node or another device. The SLSS may be identical to the SS or it may be different, potentially unique to the UE transmitting it. However, not all UEs transmit the SLSSs. Typically, a UE will transmit the SLSS when the UE is in the coverage area of the serving access node and the UE is in the RRC_IDLE state or the UE is in the coverage area of the serving access node and the UE is in the RRC_CONNECTED state with the networkControlledSyncTx not included in the resource assignment, and if the reference signal received power (RSRP) of the serving access node does not meet a specified signal quality threshold. In other words, when the UE is in the coverage area of its serving access node, the UE may transmit the SLSS when signal quality diminishes to a threshold, as can occur when the UE is located near the outer edges of the coverage area or when excessive pathloss occurs. When the UE is outside of coverage area of the serving access node, the UE will transmit the SLSS if there is no synchronization reference from other UEs that meet a signal quality threshold.

Figure 4A:
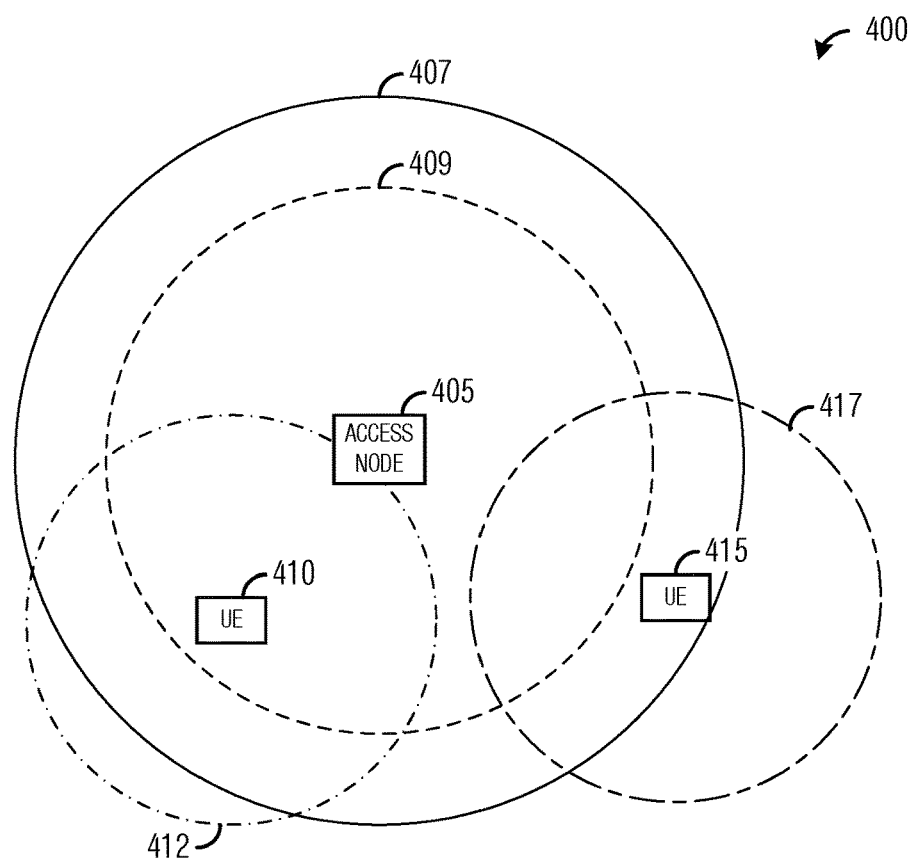
FIG. 4A illustrates a communications system highlighting UEs in the coverage area of an access node transmitting sidelink synchronization signals (SLSSs)

FIG. 4A illustrates a first communications system 400 highlighting UEs in the coverage area of an access node transmitting SLSSs. Communications system 400 includes an access node 405 with coverage area 407 serving UE 410 (with coverage area 412) and UE 415 (with coverage area 417). Circular line 409 represents a boundary within coverage area 407 of access node 405 and marks where the signal quality of transmissions by access node 405 meet a predetermined signal quality threshold. Portions of coverage area 407 inside of circular line 409 correspond to an area where the signal quality of transmissions by access node 405 is greater than the predetermined signal quality threshold, while portions of coverage area 407 outside of circular line 409 correspond to an area where the signal quality of transmissions by access node 405 is less than the predetermined signal quality threshold. The figures shown and discussed in this discussion present a circular shape as an idealized view of the coverage area of a device. In practice, the coverage area of a device will not be a perfect circle.

As shown in FIG. 4A, UE 410 is located inside circular region 409, hence the RSRP of transmissions made by access node 405 meets the signal quality threshold. Therefore, UE 410 does not transmit the SLSS. However, UE 415 is located outside circular region 409, hence the RSRP of transmissions made by access node 405 does not meet the signal quality threshold. If UE 415 is in the correct RRC state, UE 415 may transmit the SLSS.

Figure 4B:
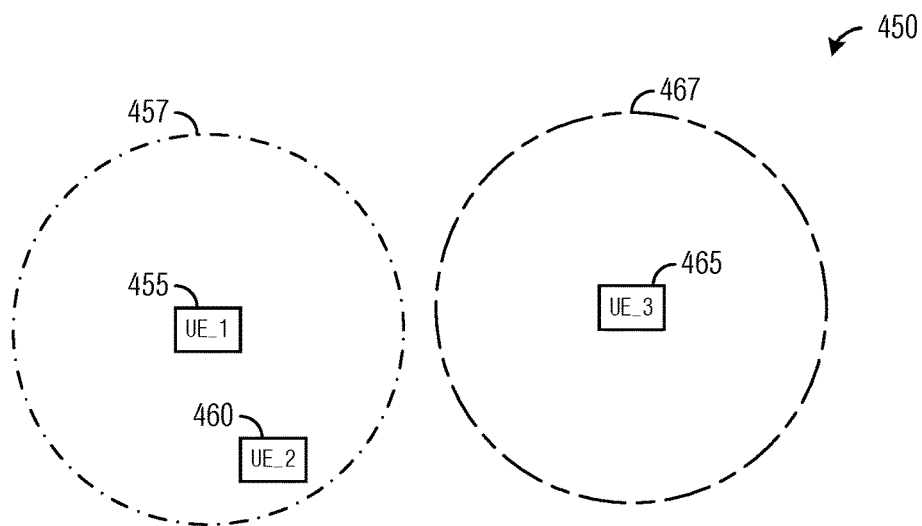
FIG. 4B illustrates a communications system highlighting UEs transmitting SLSSs when not in the coverage area of an access node.

FIG. 4B illustrates a communications system 450 highlighting UEs transmitting SLSSs when not in the coverage area of an access node. Communications system 450 includes a first UE 455 with coverage area 457. Operating within coverage area 457 is a second UE 460. Communications system 450 also includes a third UE 465 with coverage area 467. Coverage area 457 and coverage area 467 do not overlap. UE 455 transmits the SLSS. Because second UE 460 is located in coverage area 457 of UE 455, second UE 460 does not transmit the SLSS. However, third UE 465 is not located in coverage area 457 of first UE 455 or coverage area of any other UE or access node, hence third UE 465 may transmit the SLSS.

Clearly, even if a UE is far away from an access node, but still remaining within the coverage area of the access node, so that the signal quality of the access node does not meet the signal quality threshold and the UE transmits the SLSS, the additional synchronization information provided by the SLSS transmitted by UE is only helpful to the UEs that are outside of the coverage area of the access node. This is because the UEs that are inside the coverage area of the access node can detect the synchronization signal transmitted by the access node.

In the situation when the UE transmits the SLSS, it is desirable that the area only covered by the SLSS of the UE (not including the area covered by the coverage area of the access node) is maximized. Doing so increases the direct communication coverage of the UE, as well as minimizes the number of SLSS transmissions and reduces the resource allocation for SLSS transmission.

Figure 5:
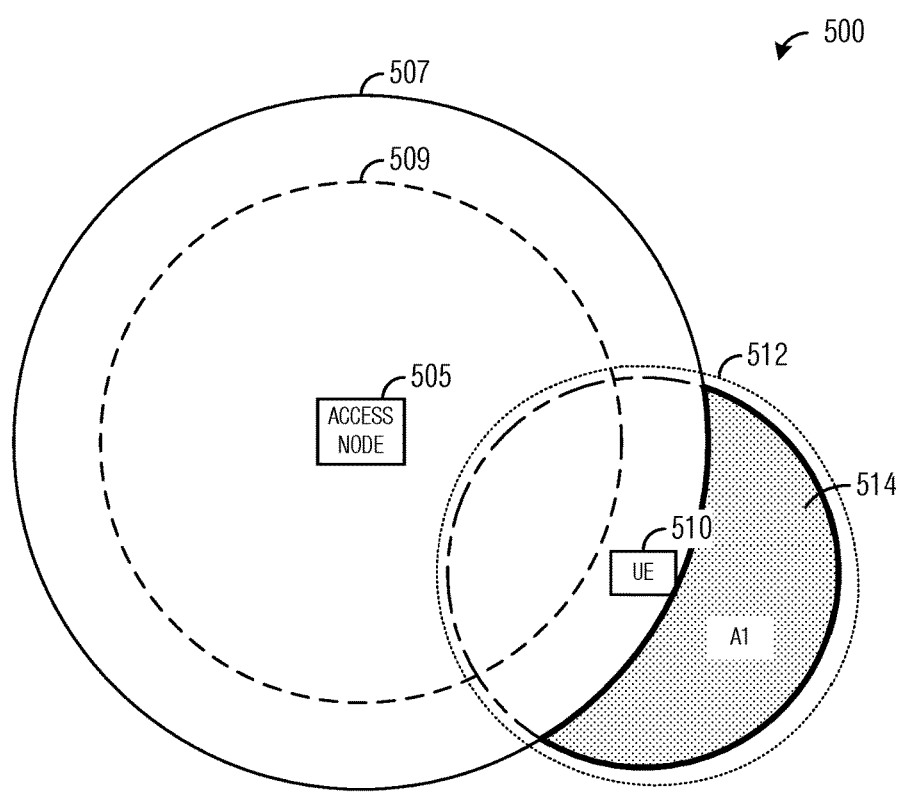
FIG. 5 illustrates a communications system highlighting the area only covered by the SLSS of a UE.

FIG. 5 illustrates a communications system 500 highlighting the area only covered by the SLSS of a UE. Communications system 500 includes an access node 505 with coverage area 507. Circular line 509 represents a boundary within coverage area 507 of access node 505 and marks where the signal quality of transmissions by access node 505 meet a predetermined signal quality threshold. Portions of coverage area 507 inside of circular line 509 correspond to an area where the signal quality of transmissions by access node 505 is greater than the predetermined signal quality threshold, while portions of coverage area 507 outside of circular line 509 correspond to an area where the signal quality of transmissions by access node 505 is less than the predetermined signal quality threshold. Access node 505 is serving UE 510, with UE 510 being located outside of circular region 509. Because UE 510 is located outside of circular region 509, UE 510 may transmit the SLSS. UE 510 has a coverage area 512, which is shown in FIG. 5 as a circular region that includes an oval-shaped area with the dashed dotted line and region A1 514. Although coverage area 512 may be large, only the portion of coverage area 512 that does not overlap with coverage area 507 (shown as region A1 514) is the area that is only covered by the SLSS transmitted by UE 510. Region A1 514 is typically less than half of coverage area 512.

According to an example embodiment, a SLSS transmitted by the UE is beamformed so that the beamforming gain is higher in an intended direction than in the direction of the SS source. In a situation where the UE is served by an access node that is transmitting the SS, the direction of the SS source is the direction from the access node to the UE. The direction of the SS source may be the angle of arrival (AoA) of the SS at the UE. Beamforming the SLSS transmission enables the direction of the energy away from the SS source, where coverage of the SS is already present, towards the intended direction, where coverage of the SS may be lacking. Therefore, the beamforming of the SLSS transmission in the intended direction helps to increase the area that is only covered by the SLSS of the UE. Hence, the beamforming of the SLSS transmission helps to enable highly reliable communication in time sensitive applications, such as D2D operations, V2X operations, V2V operations, etc.

In a situation where UEs are operating without any access nodes in close proximity, there are not any SS sources (because SSs are transmitted by access nodes). In such a situation, the SLSS transmitted by the UE is beamformed so that the beamforming gain is higher in an intended direction than in the direction of the SLSS source, which is another UE. The SLSS transmitted by the SLSS source may or may not be beamformed. In other words, the UE beamforms its SLSS transmission in such a way that the beamforming gain is higher in the intended direction than in the direction of a SLSS source detectable by the UE. Therefore, in the situation without access nodes, SLSS source may be used interchangeably with SS source.

Figure 6:
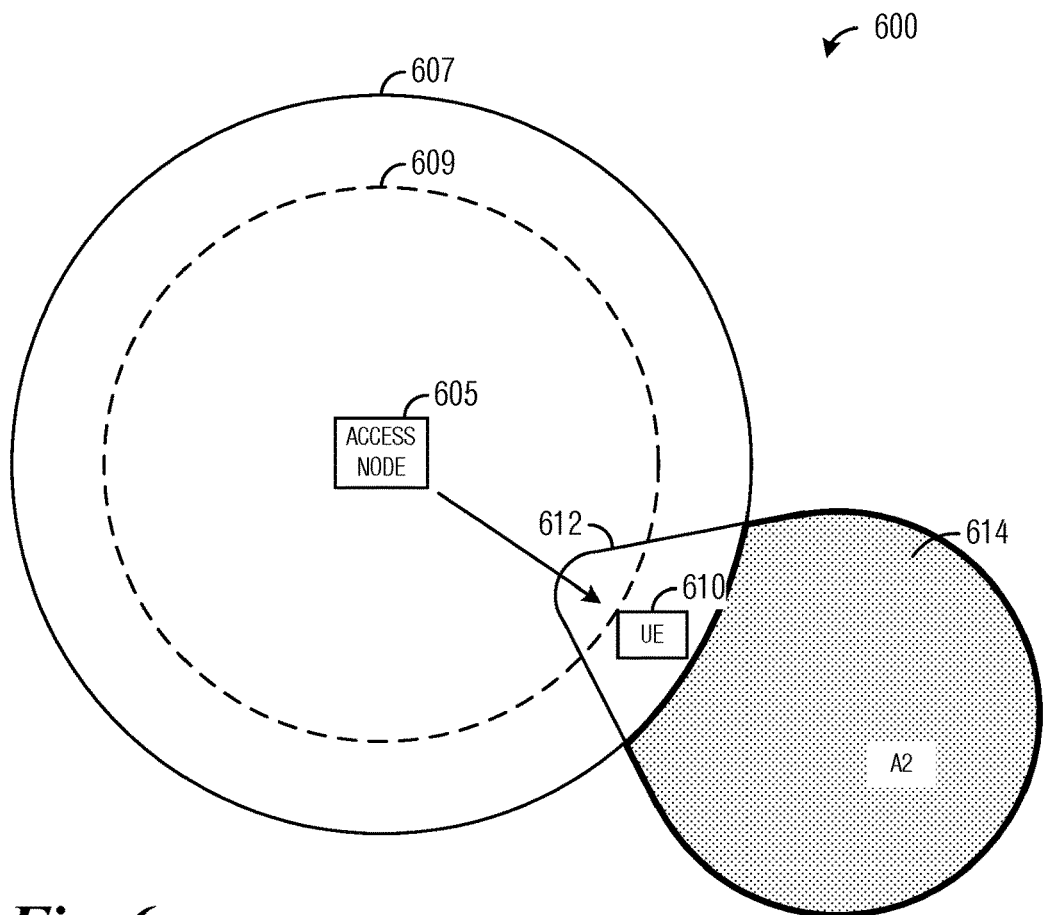
FIG. 6 illustrates a communications system highlighting the beamforming of the SLSS transmission in the intended direction according to example embodiments presented herein.

FIG. 6 illustrates a fourth communications system 600 highlighting the beamforming of the SLSS transmission in the intended direction. Communications system 600 includes an access node 605 with coverage area 607. Circular line 609 represents a boundary within coverage area 607 of access node 605 and marks where the signal quality of transmissions by access node 505 meet a predetermined signal quality threshold. Portions of coverage area 607 inside of circular line 609 correspond to an area where the signal quality of transmissions by access node 605 is greater than the predetermined signal quality threshold, while portions of coverage area 607 outside of circular line 609 correspond to an area where the signal quality of transmissions by access node 605 is less than the predetermined signal quality threshold. Access node 605 is serving UE 610, with UE 610 being located outside of circular region 609. Hence, UE 610 may transmit the SLSS. Region 612 represents the beam pattern of the beamformed SLSS transmission of UE 610, where the beamforming is in an intended direction. As shown in FIG. 6, the intended direction is 180 degrees opposed to the direction of the SS source (i.e., access node 605). Because the SLSS transmission is beamformed such that the majority of the energy is directed 180 degrees away from the SS source, the area that is only covered by the SLSS transmitted by UE 610 (shown as region A2 614) is significantly larger than the area that is only covered by the SLSS transmitted by UE 510 where beamforming is not used (region A1 514 of FIG. 5, for example).

According to an example embodiment, the UE estimates the direction of the SS source. The UE estimates the direction of the SS source when the UE receives the SS transmission, for example. In an embodiment, the UE estimates the direction of the SS source by determining the AoA of the SS. As an example, the UE may estimate the direction of the SS source as follows: the UE has a set of receive beams, where each beam within the set of receive beams may have a different beam direction; the UE may then estimate the direction of the SS source by identifying a receive beam (and its associated beam direction) used by the UE to receive the SS transmitted by the SS source. In an embodiment, the UE estimates the direction of the SS source as a group of directions. As an example, a group of directions is a range from a first angle to a second angle. As another example, a group of directions is a range of angles not include one or more specific angles, such as the direction of the SS source or directions of multiple SS sources. In an embodiment, the UE estimates the direction of the SS source as a direction with a distribution.

According to an example embodiment, the UE includes a line of sight (LOS) estimator. The LOS estimator may be a function or a circuit or a combination thereof that determines if a signal received by the UE is a LOS signal. In other words, the LOS estimator determines whether or not a signal arrived directly at the UE without having been reflected or redirected. In an embodiment, if the signal is a LOS signal, the UE applies beamforming to the SLSS transmission where the beamforming gain is higher in an intended direction than in the direction of the SS source. In an embodiment, if the signal is not a LOS signal, the UE does not apply beamforming to the SLSS transmission. A reason for using the LOS estimator to determine if beamforming is to be applied to the SLSS transmission is that if the SS reflected or redirected prior to arriving at the UE, the UE may not be able to estimate the direction of the SS source with a high degree of certainty, hence the UE will not be able to determine the intended direction with a high certainty either.

According to an example embodiment, the intended direction of a beamformed SLSS transmission is one or more directions where the beamforming gain in the one or more directions is greater than the beamforming gain of the direction of the SS source. Furthermore, the beamforming gain in the intended direction is intended to be highest in the direction opposite to the direction of the SS source. The intended direction of the SLSS transmission corresponds to the intended direction of the SLSS. The intended direction may be a single direction, multiple directions, or a range of directions. In an embodiment, the intended direction is the direction 180 degrees opposed to the direction of the SS source. In an embodiment, the intended direction is a direction (or directions) other than the direction of the SS source. As an example, if the direction of the SS source is determined to be a range from (30 degrees to 40 degrees), the intended direction may be ranges from (−180 degrees to 30 degrees) and (40 degrees to 180 degrees). In an embodiment, the intended direction may be directions that include the direction opposite (180 degrees opposed) to the direction of the SS source. In an embodiment, the UE has a set of received beams, with each beam in the set of receive beams having a different beam direction. In such a situation, the intended direction may encompass the beam direction of a subset of the receive beams that are not used to receive the SS source.

In an embodiment, if UE detects more than one SS sources with signal quality that meet the signal quality threshold, the intended direction for the UE corresponds to the SS that has the highest importance to the UE. The relative importance of an SS source to the UE may be determined based on factors such as: is the SS source associated with an access node serving the UE (with serving access nodes having higher importance than non-serving access nodes); is the SS source associated with a primary serving access node serving the UE (with primary serving access nodes having higher importance than secondary serving access nodes); a relative received signal strength of the SSs (with higher received signal strength SSs having higher importance than lower received signal strength SSs); and so on. As an example, the UE may be able to detect SS signals from multiple access nodes. However, the UE may be connected to only one (or a small number) of the access nodes. The SS associated with the access node or access nodes connected to the UE may be referred to as important SS or SSs. In such a situation, the intended direction is specified in accordance with the direction of that particular SS source. In an embodiment, the intended direction is specified in accordance with the directions of a specified number of SS sources. In an embodiment, the intended direction is specified in accordance with the directions of SS sources with signal quality exceeding a specified threshold.

According to an example embodiment, one or more beams are used to cover the intended direction of the beamformed SLSS transmission. In embodiments where the intended direction comprises multiple directions or a range of directions, multiple beams are used to provide the desired coverage. The number of beams used may be dependent upon shape or pattern of the desired coverage, with a relatively simple and uniform shape potentially being realized with one, two, or three beams, while a complex and irregular shape may require four or more beams to realize.

Figure 7A:
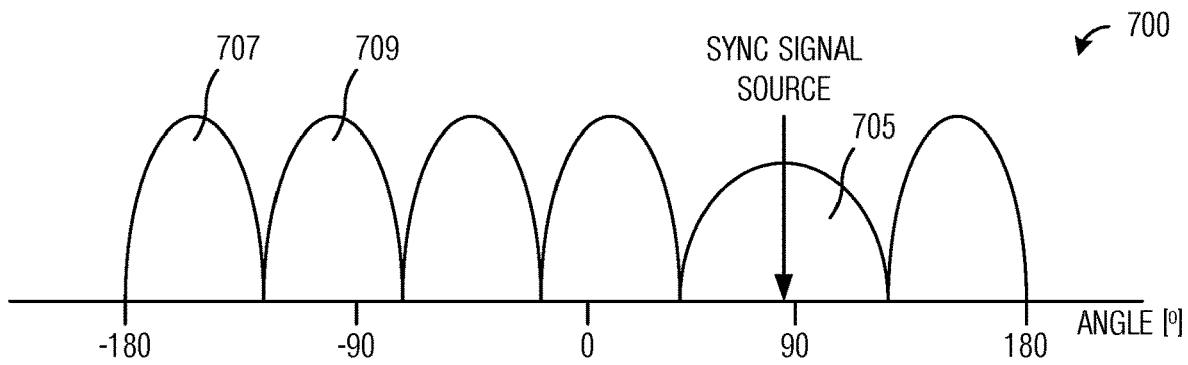
FIGS. 7A-7D illustrate example coverage patterns of SLSS transmissions according to example embodiments presented herein.

In an embodiment, the beamwidth of a beam oriented in the direction of the SS source is wider than the beamwidth of a beam or beams oriented in the intended direction. As discussed previously, for a given transmit power, a beam with a wide beamwidth will have less beamforming gain than a beam with a narrow beamwidth. Therefore, in this embodiment, there is less beamforming gain in the direction of the SS source than in the intended direction. FIG. 7A illustrates a first coverage pattern 700 of a SLSS transmission. Coverage pattern 700 is shown as an X-Y plot with the X-axis being the angle (ranges from −180 degrees to 180 degrees) and the Y-axis being the beamforming gain. A first beam 705 oriented in the direction of the SS source has a lower beamforming gain than other beams that are oriented in the intended direction, such as second beam 707 and third beam 709. Although the beams oriented in the intended direction are shown as having substantially the same beamforming gain, the actual beamforming gain of these beams may also differ, however, they remain greater than the beamforming gain of first beam 705.

Figure 7B:
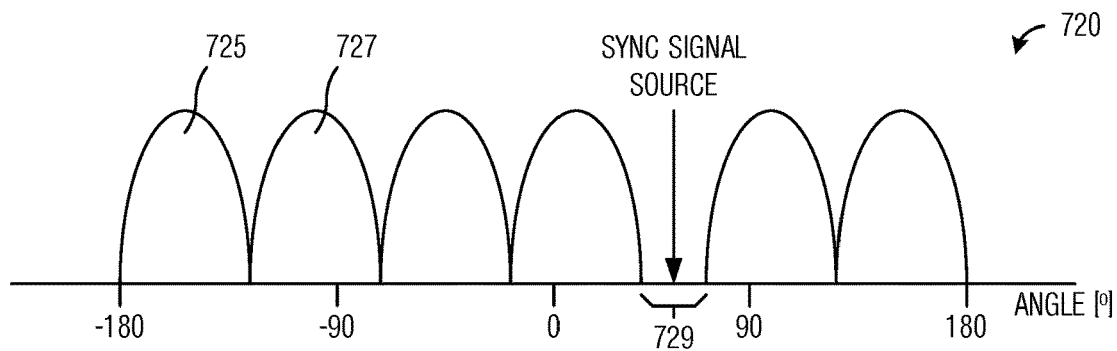

In an embodiment, the coverage excludes the direction of the SS source. In other words, the direction of the SS source is not covered. In this embodiment, coverage is provided for directions other than the direction of the SS source, where there is a beam gain dip in the direction of the SS source. In a situation where there are multiple SS sources, the intended direction will not cover the important SS or SSs. In general, a direction is considered to be covered if there is a meaningful amount of transmission power being delivered in the direction. As an example, if the direction is within the range where the beam gain exceeds a maximum beam gain minus a specified value, then the direction is said to be covered, where the specified value is in dB (e.g., 3 dB). Hence, if the beam gain in a direction is less than the maximum beam gain minus the specified value, then the direction is considered to be not covered. FIG. 7B illustrates a second coverage pattern 720 of a SLSS transmission. As shown in FIG. 7B, beams are oriented in the intended direction of the SLSS transmission, such as first beam 725 and second beam 727. However, in angular range 729 that corresponds to the direction of the SS source, there is no beam (or there is no beam with beamforming gain sufficiently high so that the direction of the SS source would be considered as being covered). Although the beams oriented in the intended direction are shown as having substantially the same beamforming gain, the actual beamforming gain of these beams may also differ.

Figure 7C:
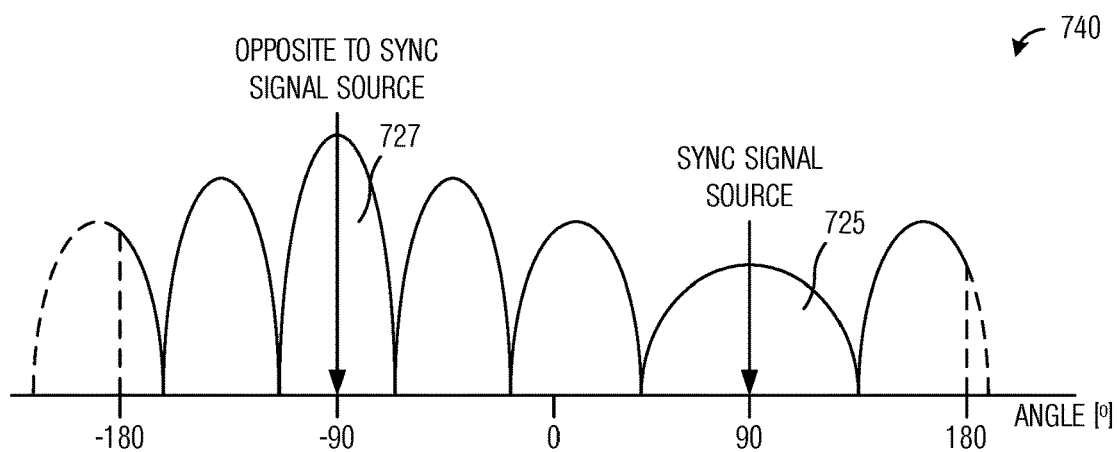

In an embodiment, the beamwidth of a beam covering the direction of the SS source is wider than the beamwidth of the beam covering the direction 180 degrees opposite to the direction of the SS source. In other words, the beamforming gain in the direction 180 degrees opposite to the direction of the SS source is greater than the beamforming gain in the direction of the SS source. FIG. 7C illustrates a third coverage pattern 740 of a SLSS transmission. As shown in FIG. 7C, the direction of the SS source is approximately 90 degrees, and the beamforming gain of a first beam 725 oriented in the direction of the SS source is substantially less than the beamforming gain of a second beam 727 oriented in the direction 180 degrees opposite to the direction of the SS source, −90 degrees.

In an embodiment, the beamwidth of the beam covering the direction 180 degrees opposite to the direction of the SS source is the smallest. The beam with the smallest beamwidth also has the highest beamforming gain. Hence, in this embodiment, the beam oriented in the direction 180 degrees opposite to the direction of the SS source has the highest beamforming gain.

Figure 7D:
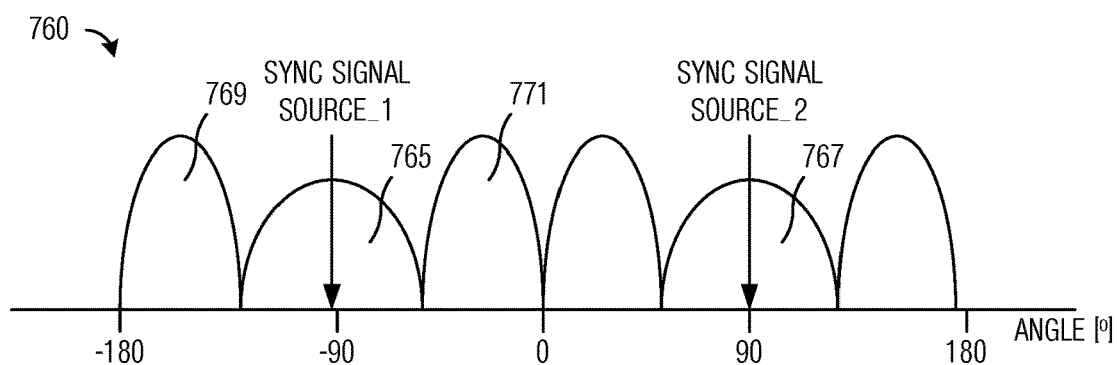

In an embodiment, a combination of the multi-beam embodiments presented herein is used. FIG. 7D illustrates a fourth coverage pattern 760 of a SLSS transmission. In the situation shown in FIG. 7D, the UE has two SS sources and has used multi-beam operation to avoid both SS sources. As shown in FIG. 7D, beam pattern 760 has two beams (beams 765 and 767) that are oriented in the direction of the two SS sources. These two beams have wider beamwidth than beams oriented in the intended direction, such as beam 769 and beam 771. The beams that are oriented in the intended direction have narrower beamwidth than the beams oriented in the direction of the SS sources. Hence, the beams oriented in the direction of the SS sources have lower beamforming gain than the beams oriented in the intended direction. Although shown in FIG. 7D as having about the same beamwidth and beamforming gains, the respective beams (the beams covering the direction of the SS sources and the beams covering the intended direction) may have differing beamwidths or beamforming gains.

According to an example embodiment, the pathloss of a channel between the UE and the SS source is considered in determining the coverage pattern of the SLSS transmission. The pathloss of the channel between the SS source and the UE may provide an indication of the distance between the SS source and the UE. The distance between the SS source and the UE can have an impact on the coverage pattern of the SLSS transmission in order to maximize the area only covered by the SLSS of the UE. As an example, if the UE is close to the SS source, the beams making up the coverage pattern should be narrow with large beamforming gain to minimize the overlap with the coverage area of the SS source. As another example, if the UE is far from the SS source (at or near the edge of the coverage area of the SS source, for example), the beams making up the coverage pattern should be wide with small beamforming gain to maximize the coverage of the beams.

According to an example embodiment, the signal quality of a transmission from the SS source is considered in determining the coverage pattern of the SLSS transmission. The signal quality of a transmission (e.g., a SS or any other signal) from the SS source may provide an indication of the distance between the SS source and the UE. The distance between the SS source and the UE can have an impact on the coverage pattern of the SLSS transmission in order to maximize the area only covered by the SLSS of the UE. As an example, if the UE is close to the SS source, the beams making up the coverage pattern should be narrow with large beamforming gain to minimize the overlap with the coverage of the SS source. As another example, if the UE is far from the SS source (at or near the edge of the coverage area of the SS source, for example), the beams making up the coverage pattern should be wide with small beamforming gain to maximize the coverage of the beams. The signal quality of a transmission may be determined from the signal to noise ratio (SNR), the signal plus interference to noise ratio (SINR), the RSRP, the received signal received quality (RSRQ), the frame error rate, the packet error rate, the bit error rate, and so forth. The signal quality of a transmission may also be determined from the pathloss of the channel, or a distance measurement of the separation between the SS source and the UE.

FIG. 8A illustrates a communications system 800 highlighting a first example use of pathloss in determining the coverage pattern of the SLSS transmission. Communications system 800 includes an access node 805 and a UE 810. Access node 805 has coverage area 807, and a circular line 809 represents a boundary within coverage area 807 of access node 805 and marks where the signal quality of transmissions by access node 805 meet a predetermined signal quality threshold. Portions of coverage area 807 inside of circular line 809 correspond to an area where the signal quality of transmissions by access node 805 is greater than the predetermined signal quality threshold, while portions of coverage area 807 outside of circular line 809 correspond to an area where the signal quality of transmissions by access node 805 is less than the predetermined signal quality threshold. Access node 805 and UE 810 are relatively close to each other, and a channel between access node 805 and UE 810 has low pathloss. Because UE 810 is close to access node 805, UE 810 is far away from the edge of coverage area 807. Therefore, to maximize the area only covered by the SLSS of UE 810, beam 815 has large beamforming gain (and hence, narrow beamwidth). As shown in FIG. 8A, a significant portion of beam 815 is outside of coverage area 807.

Figure 8B:
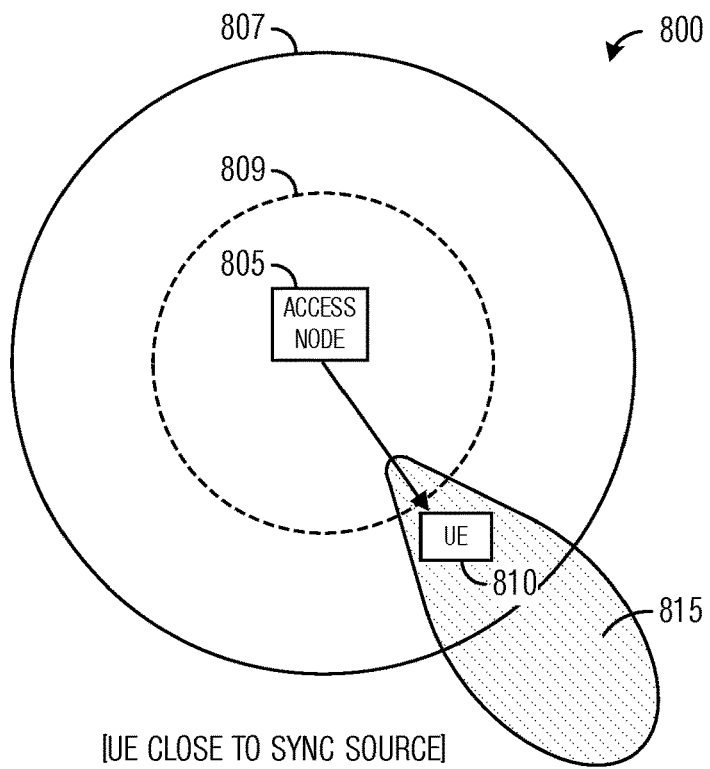
FIG. 8B illustrates a communications system highlighting a second example use of pathloss in determining the coverage pattern of the SLSS transmission according to example embodiments presented herein.
Figure 8B:
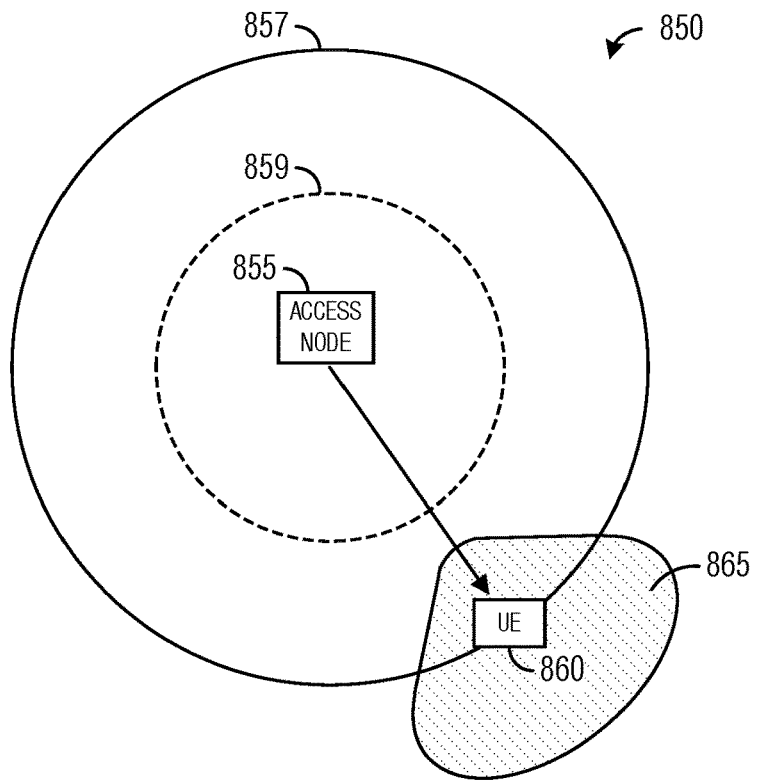

FIG. 8B illustrates a communications system 850 highlighting a second example use of pathloss in determining the coverage pattern of the SLSS transmission. Communications system 850 includes an access node 855 and a UE 860. Access node 855 has coverage area 857, and a circular line 859 represents a boundary within coverage area 857 of access node 855 marking where the signal quality of transmissions by access node 805 meet a predetermined signal quality threshold. Portions of coverage area 807 inside of circular line 809 correspond to an area where the signal quality of transmissions by access node 805 is greater than the predetermined signal quality threshold, while portions of coverage area 807 outside of circular line 809 correspond to an area where the signal quality of transmissions by access node 805 is less than the predetermined signal quality threshold. Access node 855 and UE 860 are relatively far apart from each other, and a channel between access node 855 and UE 860 has high pathloss. Because UE 860 is far away from access node 855, UE 860 is near the edge of coverage area 857. Therefore, to maximize the area only covered by the SLSS of UE 860, beam 865 has wide beamwidth (and hence, small beamforming gain). As shown in FIG. 8B, a significant portion of beam 865 is outside of coverage area 857. The use of a wide beamwidth beam for beam 865 allows for the SLSS coverage outside of coverage area 857 to be more uniformly distributed (in the spatial domain) around UE 860.

According to an example embodiment, when UEs are out of the coverage area of serving access nodes, multiple UEs can share in the responsibility of transmitting SLSSs. In D2D, V2X, and so on, communications, it may be possible to have UEs being out of the coverage area of serving access nodes. In such a situation, it may be advantageous for some UEs to transmit SLSSs. In an embodiment, the UEs collaborate through negotiation or information sharing with each other to increase the coverage of the SLSSs over conventional SLSS transmission with omni-directional transmissions. The UEs may share directional information, such as an absolute position, a relative position relative to a reference point, orientations, beam information (e.g., indices of beams used to communicate with the other), for example. The absolute position may be obtained using a satellite based positioning system (such as the Global Positioning System (GPS)) or a communications system positioning measurement system utilizing the measurement of reference signals and timing differences therein. The relative position of a first UE may be relative to a reference point, such as a second UE that the first UE is collaborating with or some other reference point of the communications system, for example.

Figure 9:
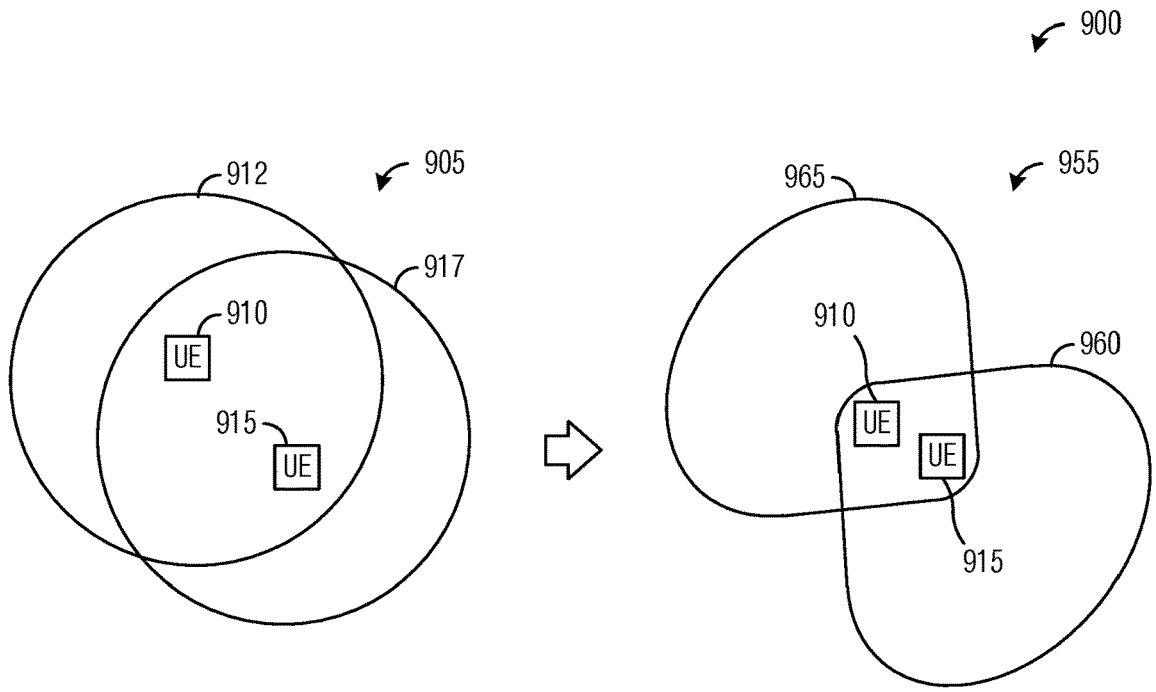
FIG. 9 illustrates a communications system highlighting the coverage enhancement possible through collaboration according to example embodiments presented herein.

As an example, if two UEs are transmitting SLSSs, the two UEs share information about their location, orientations, beam information, etc., (e.g., directional information) and may use beamforming to orient their beams in opposite (or directly towards) directions of each other to increase the overall SLSS coverage. FIG. 9 illustrates a communications system 900 highlighting the coverage enhancement possible through collaboration. Communications system 900 includes two UE, UE 910 and UE 915. Portion 905 of FIG. 9 illustrates a scenario where both UEs are transmitting SLSSs using omni-directional transmissions. Using omni-directional transmissions, UE 910 has SLSS coverage area 912, while UE 915 has SLSS coverage area 917. As shown in portion 905, the combined SLSS coverage area of the two UEs is only slightly greater than the SLSS coverage area of either one of the two UEs. Portion 955 of FIG. 9 illustrates a scenario where the two UEs have collaborated and are using beamformed transmissions to orient their SLSS transmissions directly towards each other. As shown in portion 955, UE 910 has SLSS coverage area 960 and UE 915 has SLSS coverage area 965. The combined SLSS coverage area of the two UEs is significantly larger than the SLSS coverage area of either one of the two UEs alone. Although portion 955 of FIG. 9 illustrates a situation where the UEs have oriented the beamforming of the SLSS transmissions directly towards each other, the example embodiments are operable with other orientations, hence the orientation shown in FIG. 9 should not be construed as being limiting to the scope or spirit of the example embodiments.

As another example, the UEs negotiate with each other to determine the beam directions or beamwidths of each UE. As yet another example, the UEs can monitor each other's SLSS transmissions and adjust their own transmission to maximize SLSS coverage. For example, a first UE transmits its SLSS and a second UE transmits its SLSS. The first UE identifies the SLSS transmission from the second UE and adjusts its beam direction or beamwidths in accordance with the SLSS transmission from the second UE. The second UE identifies the SLSS transmission from the first UE and adjusts its beam direction or beamwidths in accordance with the SLSS transmission from the first UE. The process may iterate a specified number of times, for example.

Figure 10:
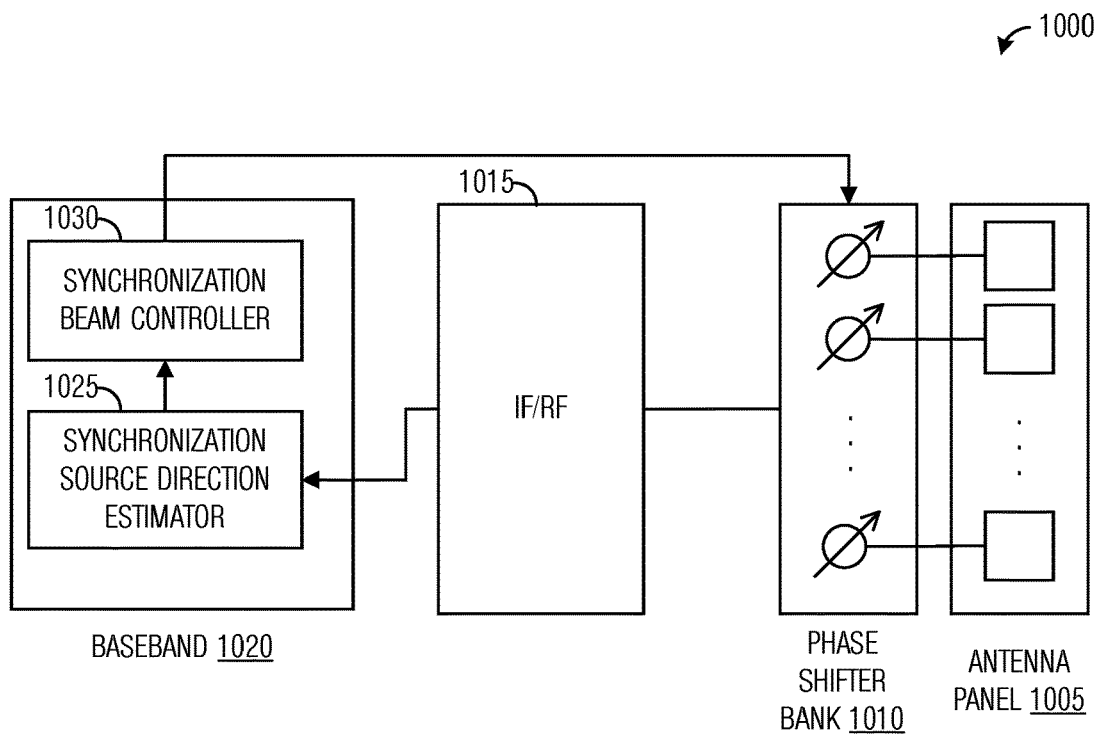
FIG. 10 illustrates an example transmitting device according to example embodiments presented herein.

FIG. 10 illustrates an example transmitting device 1000. Transmitting device 1000 is capable of configuring SLSS transmissions as described herein. Transmitting device 1000 includes one or more antenna panels 1005 that may implement transmit and receive beamforming through the application of coefficients of phase shifters of a phase shifter bank 1010 coupled to antenna panel 1005. An intermediate frequency (IF)/radio frequency (RF) unit 1015 coupled to phase shifter bank 1010 provides IF and RF signal processing for signals being transmitted or received. A baseband unit 1020 coupled to IF/RF unit 1015 provides baseband signal processing, including SS source direction estimation, SLSS beam control, LOS estimation, and so on.

A SS source direction estimation unit 1025 of baseband unit 1020 is configured to estimate the direction of SS sources detectable by transmitting device 1000. SS beam control unit 1030 may use the direction of SS source estimates determined by SS source direction estimation unit 1025 to determine the beams providing the coverage of the SLSS transmissions. A LOS estimation unit is configured to determine if a SS transmission received by transmitting device 1000 is a LOS transmission or not.

FIG. 11A illustrates a flow diagram of operations 1100 occurring in a UE transmitting a SLSS when the UE is located within a coverage area of a serving access node. Operations 1100 may be indicative of operations occurring in a UE as the UE transmits a SLSS when the UE is located in the coverage area of a serving access node.

Operations 1100 begin with the UE receiving a signal, such as a SS, from a signal source, such as the serving access node or another access node (block 1105). The UE may perform a check to determine if the signal is LOS (block 1107). If the signal is not LOS, the UE may not be able to accurately determine the direction of the signal source. Hence, the UE would not be able to accurately determine the coverage area of its SLSS to avoid the direction of the signal source.

If the signal is LOS or if the UE is not considering LOS, the UE determines the direction of the signal source (block 1109). The direction of the signal source may be the angle of arrival (AoA) of the SS at the UE, for example, and may be determined from measurements of the signal. The direction of the signal source may be a group of directions or a direction with a distribution. The UE determines the intended direction of the SLSS (block 1111). The intended direction is determined in accordance with the direction of the signal source. For example, the intended direction of a beamformed SLSS transmission is one or more directions where the beamforming gain in the one or more directions is greater than the beamforming gain of the direction of the signal source. The intended direction may be a single direction, multiple directions, or a range of directions. The intended direction is the direction 180 degrees opposed to the direction of the signal source, the intended direction is a direction (or directions) other than the direction of the signal source, the intended direction may be directions that include the direction opposite (180 degrees opposed) to the direction of the signal source, etc.

The UE generates one or more beams for the SLSS transmission (block 1113). The one or more beams are generated in accordance with the intended direction. The SLSS, when transmitted using the one or more beams, provides the coverage as designed by the UE. The UE may adjust the one or more beams for pathloss (block 1115). As discussed previously, pathloss may be an indicator of the distance between the signal source and the UE, and may be used to adjust the one or more beams to maximize the coverage of the SLSS. The UE transmits the SLSS using the one or more beams (block 1117). If the one or more beams have been adjusted for pathloss, the adjusted beams are used.

FIG. 11B illustrates a flow diagram of operations 1150 occurring in a UE transmitting a SLSS when the UE is one of multiple UEs transmitting SLSSs. Operations 1150 may be indicative of operations occurring in a UE as the UE transmits a SLSS when the UE is one of multiple UEs transmitting SLSSs.

Operations 1150 begin with the UE performing a check to determine if the UE is operating in the coverage area of a serving access node (block 1155). If the UE is operating in the coverage area of the serving access node, a different technique may be used to transmit a SLSS.

If the UE is not operating in the coverage area of the serving access node, the UE collaborates with other UEs in the vicinity to determine one or more beams for SLSS transmission to maximize the coverage area of the UEs' SLSS transmissions (block 1157). The collaboration between the UEs may include the UEs sharing information or negotiating between each other to increase the coverage of the SLSS transmissions. As an example, if two UEs are transmitting SLSSs, the two UEs share information about their location, orientations, beam information, etc., (e.g., directional information) and may use beamforming to orient their beams in opposite directions of each other to increase the overall SLSS coverage or the two UEs may configure their beamforming gains to maximize beamforming gain in opposite directions of each other to increase overall SLSS coverage. As another example, the UEs can monitor each other's SLSS transmissions and adjust their own transmission to maximize SLSS coverage.

The UE generates one or more beams for the SLSS transmission (block 1159). The one or more beams are generated in accordance with information associated with the collaboration, for example. As an example, if the UEs shared directional information, the UE can determine the position of the UEs and generate the one or more beams to avoid the other UEs. As an example, if the UEs monitored each other's transmissions, the UE may generate the one or more beams to avoid the other UEs as well as the other UEs' transmissions. The UE may adjust the one or more beams for pathloss (block 1161). The adjustment for pathloss may change the beamforming gain of the one or more beams to compensate for the distance between the UEs, for example. The UE transmits the SLSS using the one or more beams (block 1163).

Figure 12:
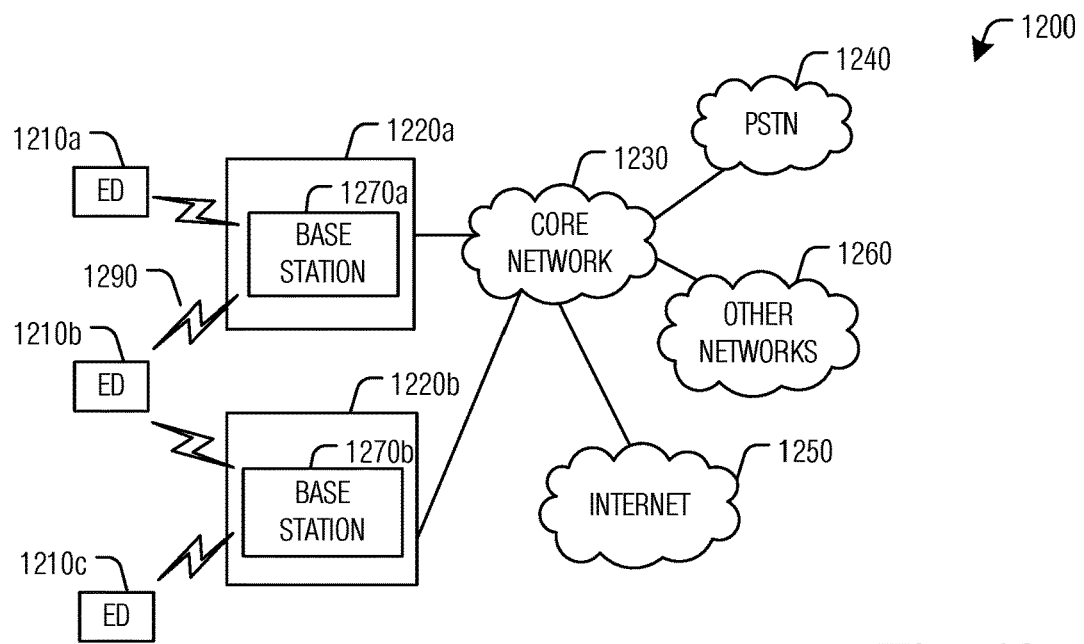
FIG. 12 illustrates an example communication system according to example embodiments presented herein.

FIG. 12 illustrates an example communication system 1200. In general, the system 1200 enables multiple wireless or wired users to transmit and receive data and other content. The system 1200 may implement one or more channel access methods, such as code division multiple access (CDMA), time division multiple access (TDMA), frequency division multiple access (FDMA), orthogonal FDMA (OFDMA), single-carrier FDMA (SC-FDMA), or non-orthogonal multiple access (NOMA).

In this example, the communication system 1200 includes electronic devices (ED) 1210a-1210c, radio access networks (RANs) 1220a-1220b, a core network 1230, a public switched telephone network (PSTN) 1240, the Internet 1250, and other networks 1260. While certain numbers of these components or elements are shown in FIG. 12, any number of these components or elements may be included in the system 1200.

The EDs 1210a-1210c are configured to operate or communicate in the system 1200. For example, the EDs 1210a-1210c are configured to transmit or receive via wireless or wired communication channels. Each ED 1210a-1210c represents any suitable end user device and may include such devices (or may be referred to) as a user equipment or device (UE), wireless transmit or receive unit (WTRU), mobile station, fixed or mobile subscriber unit, cellular telephone, personal digital assistant (PDA), smartphone, laptop, computer, touchpad, wireless sensor, or consumer electronics device.

The RANs 1220a-1220b here include base stations 1270a-1270b, respectively. Each base station 1270a-1270b is configured to wirelessly interface with one or more of the EDs 1210a-1210c to enable access to the core network 1230, the PSTN 1240, the Internet 1250, or the other networks 1260. For example, the base stations 1270a-1270b may include (or be) one or more of several well-known devices, such as a base transceiver station (BTS), a Node-B (NodeB), an evolved NodeB (eNodeB), a Next Generation (NG) NodeB (gNB), a Home NodeB, a Home eNodeB, a site controller, an access point (AP), or a wireless router. The EDs 1210*a*-1210*c* are configured to interface and communicate with the Internet 1250 and may access the core network 1230, the PSTN 1240, or the other networks 1260.

In the embodiment shown in FIG. 12, the base station 1270*a* forms part of the RAN 1220*a*, which may include other base stations, elements, or devices. Also, the base station 1270*b* forms part of the RAN 1220*b*, which may include other base stations, elements, or devices. Each base station 1270*a*-1270*b* operates to transmit or receive wireless signals within a particular geographic region or area, sometimes referred to as a "cell." In some embodiments, multiple-input multiple-output (MIMO) technology may be employed having multiple transceivers for each cell.

The base stations 1270*a*-1270*b* communicate with one or more of the EDs 1210*a*-1210*c* over one or more air interfaces 1290 using wireless communication links. The air interfaces 1290 may utilize any suitable radio access technology.

It is contemplated that the system 1200 may use multiple channel access functionality, including such schemes as described above. In particular embodiments, the base stations and EDs implement 5G New Radio (NR), LTE, LTE-A, or LTE-B. Of course, other multiple access schemes and wireless protocols may be utilized.

The RANs 1220*a*-1220*b* are in communication with the core network 1230 to provide the EDs 1210*a*-1210*c* with voice, data, application, Voice over Internet Protocol (VoIP), or other services. Understandably, the RANs 1220*a*-1220*b* or the core network 1230 may be in direct or indirect communication with one or more other RANs (not shown). The core network 1230 may also serve as a gateway access for other networks (such as the PSTN 1240, the Internet 1250, and the other networks 1260). In addition, some or all of the EDs 1210*a*-1210*c* may include functionality for communicating with different wireless networks over different wireless links using different wireless technologies or protocols. Instead of wireless communication (or in addition thereto), the EDs may communicate via wired communication channels to a service provider or switch (not shown), and to the Internet 1250.

Although FIG. 12 illustrates one example of a communication system, various changes may be made to FIG. 12. For example, the communication system 1200 could include any number of EDs, base stations, networks, or other components in any suitable configuration.

Figure 13A:
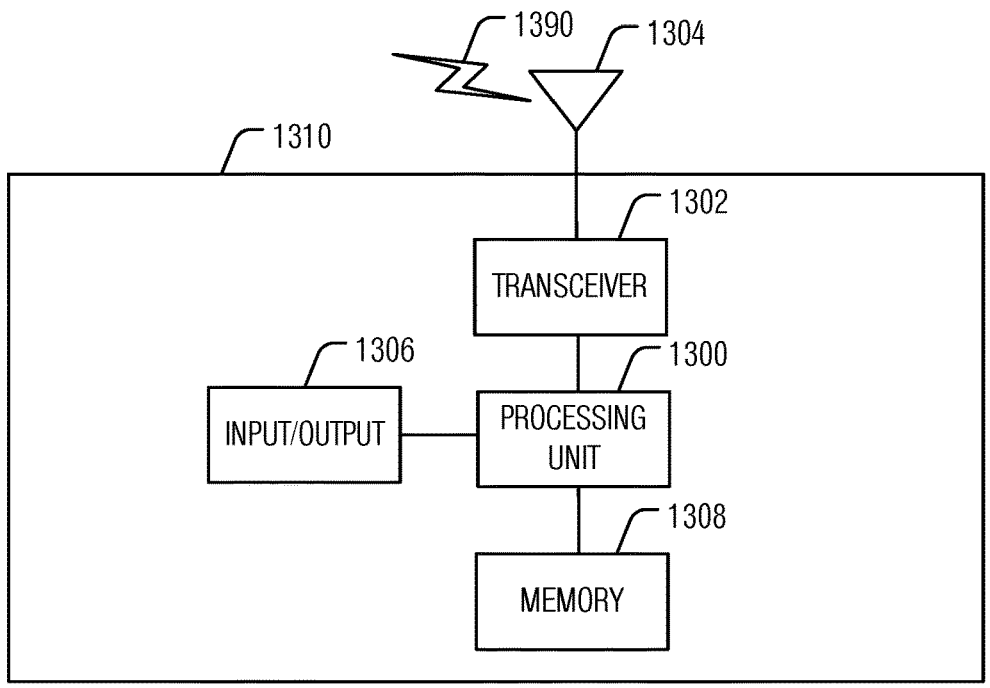
FIGS. 13A and 13B illustrate example devices that may implement the methods and teachings according to this disclosure.
Figure 13B:
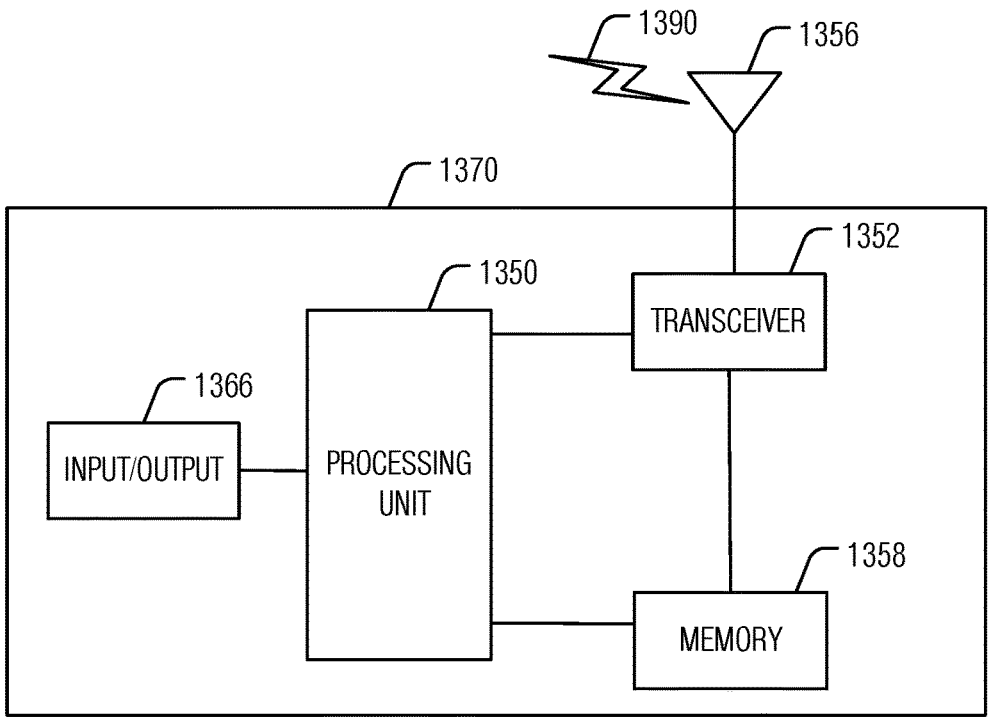

FIGS. 13A and 13B illustrate example devices that may implement the methods and teachings according to this disclosure. In particular, FIG. 13A illustrates an example ED 1310, and FIG. 13B illustrates an example base station 1370. These components could be used in the system 1200 or in any other suitable system.

As shown in FIG. 13A, the ED 1310 includes at least one processing unit 1300. The processing unit 1300 implements various processing operations of the ED 1310. For example, the processing unit 1300 could perform signal coding, data processing, power control, input/output processing, or any other functionality enabling the ED 1310 to operate in the system 1200. The processing unit 1300 also supports the methods and teachings described in more detail above. Each processing unit 1300 includes any suitable processing or computing device configured to perform one or more operations. Each processing unit 1300 could, for example, include a microprocessor, microcontroller, digital signal processor, field programmable gate array, or application specific integrated circuit.

The ED 1310 also includes at least one transceiver 1302. The transceiver 1302 is configured to modulate data or other content for transmission by at least one antenna or NIC (Network Interface Controller) 1304. The transceiver 1302 is also configured to demodulate data or other content received by the at least one antenna 1304. Each transceiver 1302 includes any suitable structure for generating signals for wireless or wired transmission or processing signals received wirelessly or by wire. Each antenna 1304 includes any suitable structure for transmitting or receiving wireless or wired signals. One or multiple transceivers 1302 could be used in the ED 1310, and one or multiple antennas 1304 could be used in the ED 1310. Although shown as a single functional unit, a transceiver 1302 could also be implemented using at least one transmitter and at least one separate receiver.

The ED 1310 further includes one or more input/output devices 1306 or interfaces (such as a wired interface to the Internet 1250). The input/output devices 1306 facilitate interaction with a user or other devices (network communications) in the network. Each input/output device 1306 includes any suitable structure for providing information to or receiving information from a user, such as a speaker, microphone, keypad, keyboard, display, or touch screen, including network interface communications.

In addition, the ED 1310 includes at least one memory 1308. The memory 1308 stores instructions and data used, generated, or collected by the ED 1310. For example, the memory 1308 could store software or firmware instructions executed by the processing unit(s) 1300 and data used to reduce or eliminate interference in incoming signals. Each memory 1308 includes any suitable volatile or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 13B, the base station 1370 includes at least one processing unit 1350, at least one transceiver 1352, which includes functionality for a transmitter and a receiver, one or more antennas 1356, at least one memory 1358, and one or more input/output devices or interfaces 1366. A scheduler, which would be understood by one skilled in the art, is coupled to the processing unit 1350. The scheduler could be included within or operated separately from the base station 1370. The processing unit 1350 implements various processing operations of the base station 1370, such as signal coding, data processing, power control, input/output processing, or any other functionality. The processing unit 1350 can also support the methods and teachings described in more detail above. Each processing unit 1350 includes any suitable processing or computing device configured to perform one or more operations. Each processing unit 1350 could, for example, include a microprocessor, microcontroller, digital signal processor, field programmable gate array, or application specific integrated circuit.

Each transceiver 1352 includes any suitable structure for generating signals for wireless or wired transmission to one or more EDs or other devices. Each transceiver 1352 further includes any suitable structure for processing signals received wirelessly or by wire from one or more EDs or other devices. Although shown combined as a transceiver 1352, a transmitter and a receiver could be separate components. Each antenna 1356 includes any suitable structure for transmitting or receiving wireless or wired signals. While a common antenna 1356 is shown here as being coupled to the transceiver 1352, one or more antennas 1356 could be coupled to the transceiver(s) 1352, allowing separate antennas 1356 to be coupled to the transmitter and the receiver if equipped as separate components. Each memory 1358 includes any suitable volatile or non-volatile storage and retrieval device(s). Each input/output device 1366 facilitates interaction with a user or other devices (network communications) in the network. Each input/output device 1366 includes any suitable structure for providing information to or receiving/providing information from a user, including network interface communications.

Figure 14:
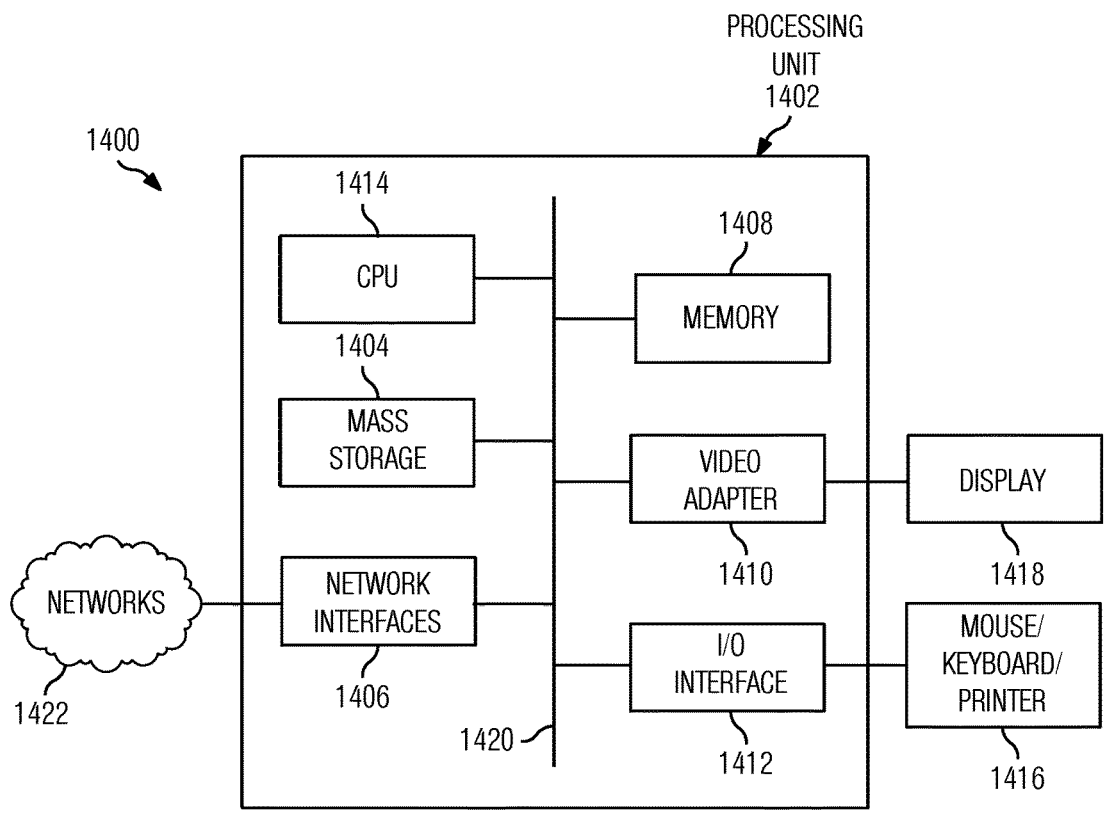
FIG. 14 is a block diagram of a computing system that may be used for implementing the devices and methods disclosed herein.

FIG. 14 is a block diagram of a computing system 1400 that may be used for implementing the devices and methods disclosed herein. For example, the computing system can be any entity of UE, access network (AN), mobility management (MM), session management (SM), user plane gateway (UPGW), or access stratum (AS). Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 1400 includes a processing unit 1402. The processing unit includes a central processing unit (CPU) 1414, memory 1408, and may further include a mass storage device 1404, a video adapter 1410, and an I/O interface 1412 connected to a bus 1420.

The bus 1420 may be one or more of any type of several bus architectures including a memory bus or memory controller, a peripheral bus, or a video bus. The CPU 1414 may comprise any type of electronic data processor. The memory 1408 may comprise any type of non-transitory system memory such as static random access memory (SRAM), dynamic random access memory (DRAM), synchronous DRAM (SDRAM), read-only memory (ROM), or a combination thereof. In an embodiment, the memory 1408 may include ROM for use at boot-up, and DRAM for program and data storage for use while executing programs.

The mass storage 1404 may comprise any type of non-transitory storage device configured to store data, programs, and other information and to make the data, programs, and other information accessible via the bus 1420. The mass storage 1404 may comprise, for example, one or more of a solid state drive, hard disk drive, a magnetic disk drive, or an optical disk drive.

The video adapter 1410 and the I/O interface 1412 provide interfaces to couple external input and output devices to the processing unit 1402. As illustrated, examples of input and output devices include a display 1418 coupled to the video adapter 1410 and a mouse, keyboard, or printer 1416 coupled to the I/O interface 1412. Other devices may be coupled to the processing unit 1402, and additional or fewer interface cards may be utilized. For example, a serial interface such as Universal Serial Bus (USB) (not shown) may be used to provide an interface for an external device.

The processing unit 1402 also includes one or more network interfaces 1406, which may comprise wired links, such as an Ethernet cable, or wireless links to access nodes or different networks. The network interfaces 1406 allow the processing unit 1402 to communicate with remote units via the networks. For example, the network interfaces 1406 may provide wireless communication via one or more transmitters/transmit antennas and one or more receivers/receive antennas. In an embodiment, the processing unit 1402 is coupled to a local-area network 1422 or a wide-area network for data processing and communications with remote devices, such as other processing units, the Internet, or remote storage facilities.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a beamforming unit or module, or a determining unit or module. The respective units or modules may be hardware, software, or a combination thereof. For instance, one or more of the units or modules may be an integrated circuit, such as field programmable gate arrays (FPGAs) or application-specific integrated circuits (ASICs).

Although the present disclosure and its advantages have been described in detail, it should be understood that various changes, substitutions and alterations can be made herein without departing from the scope of the disclosure as defined by the appended claims.

What is claimed is:

1. A method implemented by a device, the method comprising:
   determining, by the device, a direction of a first signal source based on a first signal received from the first signal source;
   beamforming, by the device, a second signal with a first beamforming gain in the direction of the first signal source, and a second beamforming gain in an intended direction of the second signal, the first beamforming gain being smaller than the second beamforming gain; and
   transmitting, by the device, the beamformed second signal at least in the direction and in the intended direction.

2. The method of claim 1, the intended direction comprising a direction that is opposite to the direction of the first signal source.

3. The method of claim 1, the intended direction comprising multiple directions not including the direction of the first signal source.

4. The method of claim 1, the intended direction comprising multiple directions including a direction that is opposite to the direction of the first signal source.

5. The method of claim 1, the direction of the first signal source comprising an angle of arrival (AoA) of the first signal.

6. The method of claim 1, the device comprising a user equipment (UE).

7. The method of claim 1, the first signal comprising a first synchronization signal, and the second signal comprising a second synchronization signal.

8. The method of claim 1, further comprising adjusting, by the device, at least the second beamforming gain with a pathloss between the device and the first signal source.

9. The method of claim 1, further comprising:
   receiving, by the device, a third signal from a second signal source;
   beamforming, by the device, a fourth signal with a third beamforming gain in the direction of the second signal source and the direction of the first signal source, and a fourth beamforming gain in an intended direction of the fourth signal, and a fifth beamforming gain in the direction of the first signal source, the third beamforming gain being smaller than the fourth beamforming gain, and the fifth beamforming gain being smaller than the fourth beamforming gain; and
   transmitting, by the device, the beamformed fourth signal.

10. The method of claim 1, the first signal having lower priority than a third signal, the method further comprising:
    receiving, by the device, the third signal from a second signal source;

beamforming, by the device, a fourth signal with a third beamforming gain in the direction of the second signal source, and a fourth beamforming gain in an intended direction of the fourth signal, the third beamforming gain being smaller than the fourth beamforming gain; and transmitting, by the device, the beamformed fourth signal.

11. The method of claim 1, further comprising determining, by the device, that the first signal source is a line of sight (LOS) signal source prior to determining the intended direction for the second signal, beamforming the second signal, and transmitting the second signal.

12. The method of claim 1, at least a first beam with the first beamforming gain and a second beam with the second beamforming gain being used to beamform the second signal.

13. The method of claim 12, a first beamwidth of the first beam in the direction of the first signal source being greater than a second beamwidth of the second beam oriented in at least a portion of the intended direction.

14. The method of claim 12, further comprising adjusting, by the device, a beamforming gain of at least the second beam with a pathloss between the device and the first signal source.

15. The method of claim 1, further comprising transmitting, by the device, directional information of the device.

16. The method of claim 15, the directional information comprising an absolute position of the device, or a position of the device relative to a first reference point.

17. The method of claim 1, the direction of the first signal source being determined with directional information of the first signal source, the directional information of the first signal source comprising an absolute position of the first signal source or a position of the first signal source relative to a second reference point, and the method further comprising transmitting from the first device to the first signal source, directional information of the device, the intended direction of the second signal being determined with the directional information of the device.

18. The method of claim 1, wherein the second signal is a sidelink (SL) signal, and wherein the direction for transmitting the second signal is towards the first signal source and opposite to the intended direction.

19. The method of claim 1, wherein the first signal is a downlink (DL) synchronization signal (SS), and the second signal is an SL synchronization signal (SLSS).

20. A device, comprising:
at least one processor; and
a non-transitory computer readable storage medium storing programming, the programming including instructions that, when executed by the at least one processor, cause the device to perform operations including:
determining a direction of a first signal source based on a first signal received from the first signal source;
beamforming a second signal with a first beamforming gain in the direction of the first signal source, and a second beamforming gain in an intended direction of the second signal, the first beamforming gain being smaller than the second beamforming gain; and
transmitting the beamformed second signal at least in the direction and in the intended direction.

21. The device of claim 20, the intended direction comprising a direction that is opposite to the direction of the first signal source.

22. The device of claim 20, the intended direction comprising multiple directions not including the direction of the first signal source.

23. The device of claim 20, the intended direction comprising multiple directions including a direction that is opposite to the direction of the first signal source.

24. The device of claim 20, the operations further comprising:
adjusting at least the second beamforming gain with a pathloss between the device and the first signal source.

25. A non-transitory computer-readable medium having instructions stored thereon that, when executed by a device, cause the device to perform operations, the operations comprising:
determining a direction of a first signal source based on a first signal received from the first signal source;
beamforming a second signal with a first beamforming gain in the direction of the first signal source, and a second beamforming gain in an intended direction of the second signal, the first beamforming gain being smaller than the second beamforming gain; and
transmitting the beamformed second signal at least in the direction and in the intended direction.

* * * * *

UNITED STATES PATENT AND TRADEMARK OFFICE
CERTIFICATE OF CORRECTION

PATENT NO. : 12,279,131 B2  
APPLICATION NO. : 17/627536  
DATED : April 15, 2025  
INVENTOR(S) : Kwon et al.

Page 1 of 1

It is certified that error appears in the above-identified patent and that said Letters Patent is hereby corrected as shown below:

In the Claims

In Column 23, in Claim 17, Line 37, after "from the" delete "first".

Signed and Sealed this
Twentieth Day of May, 2025

Coke Morgan Stewart
*Acting Director of the United States Patent and Trademark Office*